(12) United States Patent
Shimomura

(10) Patent No.: US 10,776,017 B2
(45) Date of Patent: Sep. 15, 2020

(54) VEHICLE-MOUNTED RELAY DEVICE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Yoshikuni Shimomura, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 130 days.

(21) Appl. No.: 15/538,451

(22) PCT Filed: Dec. 22, 2015

(86) PCT No.: PCT/JP2015/085799
§ 371 (c)(1),
(2) Date: Jun. 21, 2017

(87) PCT Pub. No.: WO2016/111164
PCT Pub. Date: Jul. 14, 2016

(65) Prior Publication Data
US 2017/0351445 A1    Dec. 7, 2017

(30) Foreign Application Priority Data
Jan. 5, 2015    (JP) .................................. 2015-000433

(51) Int. Cl.
G06F 3/06        (2006.01)
H04L 12/28      (2006.01)
(Continued)

(52) U.S. Cl.
CPC ........ *G06F 3/0619* (2013.01); *B60R 16/0231* (2013.01); *G06F 3/065* (2013.01);
(Continued)

(58) Field of Classification Search
CPC .... G06F 3/0619; G06F 15/7821; G06F 3/067; G06F 3/065; B60R 16/0231; H04L 12/28; H04L 12/46; H04L 67/12
(Continued)

(56) References Cited

U.S. PATENT DOCUMENTS

2010/0144326 A1* 6/2010 Wilhelmsson ......... G08G 1/202
455/414.1
2011/0039508 A1* 2/2011 Lindahl ................ G06F 1/3203
455/230
(Continued)

FOREIGN PATENT DOCUMENTS

| JP | 2004-192278 A | 7/2004 |
|----|---------------|--------|
| JP | 2006-108995 A | 4/2006 |

(Continued)

OTHER PUBLICATIONS

Search Report for Int'l Appln. No. PCT/JP2015/085799, dated Feb. 23, 2016.

*Primary Examiner* — David Yi
*Assistant Examiner* — Zubair Ahmed
(74) *Attorney, Agent, or Firm* — Honigman LLP

(57) ABSTRACT

Provided is a vehicle-mounted relay device that can suppress failures in reading/writing of data due to electric power shortage. The vehicle-mounted relay device determines whether or not reading/writing of data is possible based on the required amount of stored power in the electric power storage device and the remaining amount of stored power in the electric power storage device needed to read/write the data. If the remaining amount of stored power is equal to or (Continued)

greater than the required amount of stored power, there is no risk that the remaining amount of stored power in the electric power storage device may run short before the reading/writing of the data ends. Accordingly, if it is determined that reading/writing of the data is possible, the vehicle-mounted relay device causes an ECU, which is a vehicle-mounted control device, to start reading/writing the data.

4 Claims, 21 Drawing Sheets

(51) Int. Cl.
*H04L 12/46* (2006.01)
*B60R 16/023* (2006.01)
*G06F 15/78* (2006.01)
*H04L 29/08* (2006.01)

(52) U.S. Cl.
CPC .......... *G06F 3/067* (2013.01); *G06F 15/7821* (2013.01); *H04L 12/28* (2013.01); *H04L 12/46* (2013.01); *H04L 67/12* (2013.01)

(58) Field of Classification Search
USPC .......................................................... 711/162
See application file for complete search history.

(56) References Cited

U.S. PATENT DOCUMENTS

| | | | |
|---|---|---|---|
| 2013/0197712 A1* | 8/2013 | Matsuura | B60R 25/24 701/1 |
| 2014/0351803 A1* | 11/2014 | Hoffman | G06F 8/65 717/168 |
| 2017/0075678 A1* | 3/2017 | Kurosawa | B60R 16/02 |

FOREIGN PATENT DOCUMENTS

| | | |
|---|---|---|
| JP | 2011-040912 A | 2/2011 |
| JP | 2014-029619 A | 2/2014 |
| JP | 2014-113860 A | 6/2014 |

* cited by examiner

US 10,776,017 B2

VEHICLE-MOUNTED RELAY DEVICE

CROSS-REFERENCE TO RELATED APPLICATIONS

This application is the U.S. national stage of PCT/JP2015/085799 filed Dec. 22, 2015, which claims priority of Japanese Patent Application No. JP 2015-000433 filed Jan. 5, 2015.

TECHNICAL FIELD

The present invention relates to a vehicle-mounted relay device that relays communication between a vehicle-mounted control device and a vehicle exterior device.

BACKGROUND

In recent years, a plurality of ECUs (electronic control units) are installed in vehicles. The ECUs are supplied with electric power from an electric power storage device to control operation of vehicle-mounted devices (such as an engine, a light source device, or an air-conditioning device).

The ECUs each include a storage unit in which a computer program (hereinafter, referred to as "program") is stored.

Conventionally, a program updating method has been proposed in which a program (i.e., old program) that is stored in a first storage unit of a first ECU is, before being updated, copied to a second storage unit of a second ECU (see JP 2014-029619A).

In the program updating method according to JP 2014-029619A, after copying the old program to the second storage unit, the first ECU receives a new program from a vehicle exterior device, and writes the received new program into the first storage unit. If the writing of the new program is unsuccessful, the first ECU writes back the old program stored in the second storage unit to the first storage unit.

Furthermore, the ECUs each include an accumulation unit in which failure information is accumulated.

Conventionally, a vehicle-mounted relay device has been proposed that requests an ECU to transmit failure information, and transmits the failure information that is read from the accumulation unit by the EUC to a vehicle exterior device (see JP 2014-113860A).

If a program is updated when the remaining amount of stored power in the electric power storage device is insufficient, writing of a new program may fail due to electric power shortage during the writing.

If failure information is requested when the remaining amount of stored power in the electric power storage device is insufficient, reading of the failure information may fail due to electric power shortage during the reading.

Such failures waste electric power, and should thus be avoided.

The present invention was made in view of the above-described circumstances, and it is a main object thereof to provide a vehicle-mounted relay device that can suppress failures in reading/writing of data due to electric power shortage.

SUMMARY

According to the present invention, a vehicle-mounted relay device configured to receive, from a vehicle exterior device, a data write instruction to write data, as well as write data to be written, and to relay communication between a plurality of vehicle-mounted control devices that each include a data storage unit in which data is stored, that are supplied with electric power from an electric power storage device, that control operation of a vehicle-mounted device, and that write data given to them into the data storage unit, the vehicle-mounted relay device include: writing deciding means for deciding a writing target that is to write the write data and is included in the plurality of vehicle-mounted control devices, in accordance with the received data write instruction; writing calculation means for calculating a required amount of stored power in the electric power storage device that is needed for writing the write data, using a data amount of the write data that is to be written into the writing target decided by the writing deciding means; remaining amount detection means for detecting a remaining amount of stored power in the electric power storage device; writing determination means for determining whether or not data writing is possible based on the required amount of stored power that was calculated by the writing calculation means, and the remaining amount of stored power that was detected by the remaining amount detection means; and writing starting means for causing the writing target to start writing the write data if it is determined by the writing determination means that data writing is possible.

The vehicle-mounted relay device according to the present invention may further include: redetecting means for redetecting a remaining amount of stored power in the electric power storage device after the writing starting means has started the writing; writing recalculation means for calculating a required amount of stored power in the electric power storage device that is needed for writing the write data, based on a remaining data amount of write data that has not yet been written; writing continuation determination means for determining whether or not the data writing can be continued, based on the required amount of stored power that was calculated by the writing recalculation means, and the remaining amount of stored power that was detected by the redetecting means; and writing discontinuation means for causing the writing target to discontinue the writing of the write data if it is determined by the writing continuation determination means that the data writing cannot be continued.

The vehicle-mounted relay device according to the present invention may be such that it control operation of a notification device configured to perform notification of information, and may further include notification control means for letting, if it is determined by the writing continuation determination means that the data writing cannot be continued, the notification device perform notification of information before the discontinuation of the writing is caused by the writing discontinuation means.

According to the present invention, a vehicle-mounted relay device configured to receive, from a vehicle exterior device, a data read instruction to read data, and to relay communication between a plurality of vehicle-mounted control devices that each include an accumulation unit in which data is accumulated, that are supplied with electric power from an electric power storage device, that control operation of a vehicle-mounted device, and that read accumulated data accumulated in the accumulation unit, the vehicle-mounted relay device includes: reading deciding means for deciding a reading target that is to read the accumulated data and is included in the plurality of vehicle-mounted control devices, in accordance with the received data read instruction; reading calculation means for calculating a required amount of stored power in the electric power storage device that is needed for reading the accumulated data, using a data amount of the accumulated data that is to be read by the reading target decided by the reading deciding means; remaining amount detection means for detecting a remaining amount of stored power in the electric power storage device; reading determination means for determining whether or not data reading is possible based on the required amount of stored power that was calculated by the reading calculation means and the remaining amount of stored power that was detected by the remaining amount detection means; and reading starting means for causing the reading target to start reading the accumulated data if it is determined by the reading determination means that data reading is possible.

The vehicle-mounted relay device according to the present invention may further include: redetecting means for redetecting a remaining amount of stored power in the electric power storage device after the reading starting means has started the reading; reading recalculation means for calculating a required amount of stored power in the electric power storage device that is needed for reading the accumulated data, based on a remaining data amount of accumulated data that has not yet been read; reading continuation determination means for determining whether or not the data reading can be continued, based on the required amount of stored power that was calculated by the reading recalculation means and the remaining amount of stored power that was detected by the redetecting means; and reading discontinuation means for causing the reading target to discontinue the reading of the accumulated data if it is determined by the reading continuation determination means that the data reading cannot be continued.

The vehicle-mounted relay device according to the present invention may be such that it can control operation of a notification device configured to perform notification of information, and may further include, notification control means for letting, if it is determined by the reading continuation determination means that the data reading cannot be continued, the notification device perform notification of information before the discontinuation of the reading is caused by the reading discontinuation means.

The vehicle-mounted relay device according to the present invention may further include a maximum storage unit in which the vehicle-mounted control devices and maximum values of the amounts of data that can be accumulated in the respective vehicle-mounted control devices are stored in association with each other, wherein the reading calculation means is configured to use the maximum value that is stored in the maximum storage unit in association with the reading target decided by the reading deciding means, as the data amount of accumulated data to be read.

According to the present invention, the vehicle-mounted relay device determines whether or not data writing is possible, based on the required amount of stored power in the electric power storage device that is needed for writing the write data, and the remaining amount of stored power in the electric power storage device.

The larger the data amount of write data to be written into the data storage unit of the vehicle-mounted control device is, the larger the required amount of stored power in the electric power storage device is, but if the remaining amount of stored power is equal to or greater than the required amount of stored power, there is no risk that the remaining amount of stored power in the electric power storage device may run short between the start and the end of the writing of the write data.

Accordingly, if it is determined that data writing is possible, the vehicle-mounted relay device causes the vehicle-mounted control device to start writing the write data into the data storage unit.

According to the present invention, after the start of the writing of the write data, the vehicle-mounted relay device determines whether or not data writing is possible, based on the required amount of stored power in the electric power storage device that is needed for writing write data that has not yet been written into the data storage unit, and the remaining amount of stored power in the electric power storage device. The required amount of stored power in the electric power storage device is obtained based on the amount of write data (remaining data amount of write data) that has not yet been written into the data storage unit.

If it is determined that the writing cannot be continued, the vehicle-mounted relay device causes the vehicle-mounted control device to discontinue the writing of the write data.

Since the vehicle-mounted relay device monitors the remaining amount of stored power in the electric power storage device even after the start of the writing of the write data in this way, thus suppressing failures in writing of the write data.

According to the present invention, if it is determined that the data writing cannot be continued, the notification device performs notification of information before the writing of the write data is discontinued.

An operator that has been notified of the information can recognize that the data writing cannot be continued, and can take a measure to prevent the discontinuation of the writing of the write data in some cases.

According to the present invention, the vehicle-mounted relay device determines whether or not data reading is possible based on the required amount of stored power in the electric power storage device that is needed for reading accumulated data, and the remaining amount of stored power in the electric power storage device.

The larger the data amount of accumulated data to be read from the accumulation unit of the vehicle-mounted control device is, the larger the required amount of stored power in the electric power storage device is, but if the remaining amount of stored power is equal to or greater than the required amount of stored power, there is no risk that the remaining amount of stored power in the electric power storage device may run short between the start and the end of the reading of the accumulated data.

Accordingly, if it is determined that data reading is possible, the vehicle-mounted relay device causes the vehicle-mounted control device to start reading the accumulated data from the accumulation unit.

According to the present invention, after the start of the accumulated data, the vehicle-mounted relay device determines whether or not data reading is possible based on the required amount of stored power in the electric power storage device that is needed for reading accumulated data that has not yet been read from the accumulation unit, and the remaining amount of stored power in the electric power storage device. The required amount of stored power in the electric power storage device is obtained based on the amount of accumulated data (remaining data amount of accumulated data) that has not yet been read from the accumulation unit.

If it is determined that the data reading cannot be continued, the vehicle-mounted relay device causes the vehicle-mounted control device to discontinue the reading of the accumulated data.

Since the vehicle-mounted relay device monitors the remaining amount of stored power in the electric power storage device even after the start of the reading of the accumulated data in this way, thus suppressing failures in reading of the accumulated data.

According to the present invention, if it is determined that the data reading cannot be continued, the notification device performs notification of information before the reading of the accumulated data is discontinued.

An operator that has been notified of the information can recognize that the data reading cannot be continued, and can take a measure to prevent the discontinuation of the reading of the accumulated data in some cases According to the present invention, the vehicle-mounted relay device knows the data amount of accumulated data to be read from the accumulation unit, and thus does not need to inquiry the vehicle-mounted control device every time.

Advantageous Effects of Invention

In the vehicle-mounted relay device according to the present invention, whether or not reading/writing is possible is determined based on the required amount of stored power in an electric power storage device that corresponds to the amount of data to be read and written, and the remaining amount of stored power in the electric power storage device. This thus avoids cases where reading/writing of the data start even if the remaining amount of stored power in the electric power storage device is insufficient. Accordingly, it is possible to suppress failures in reading/writing of data due to electric power shortage.

DETAILED DESCRIPTION OF THE PREFERRED EMBODIMENTS

Hereinafter, the present invention will be described with reference to the drawings showing embodiments thereof.

Embodiment 1

Figure 1:
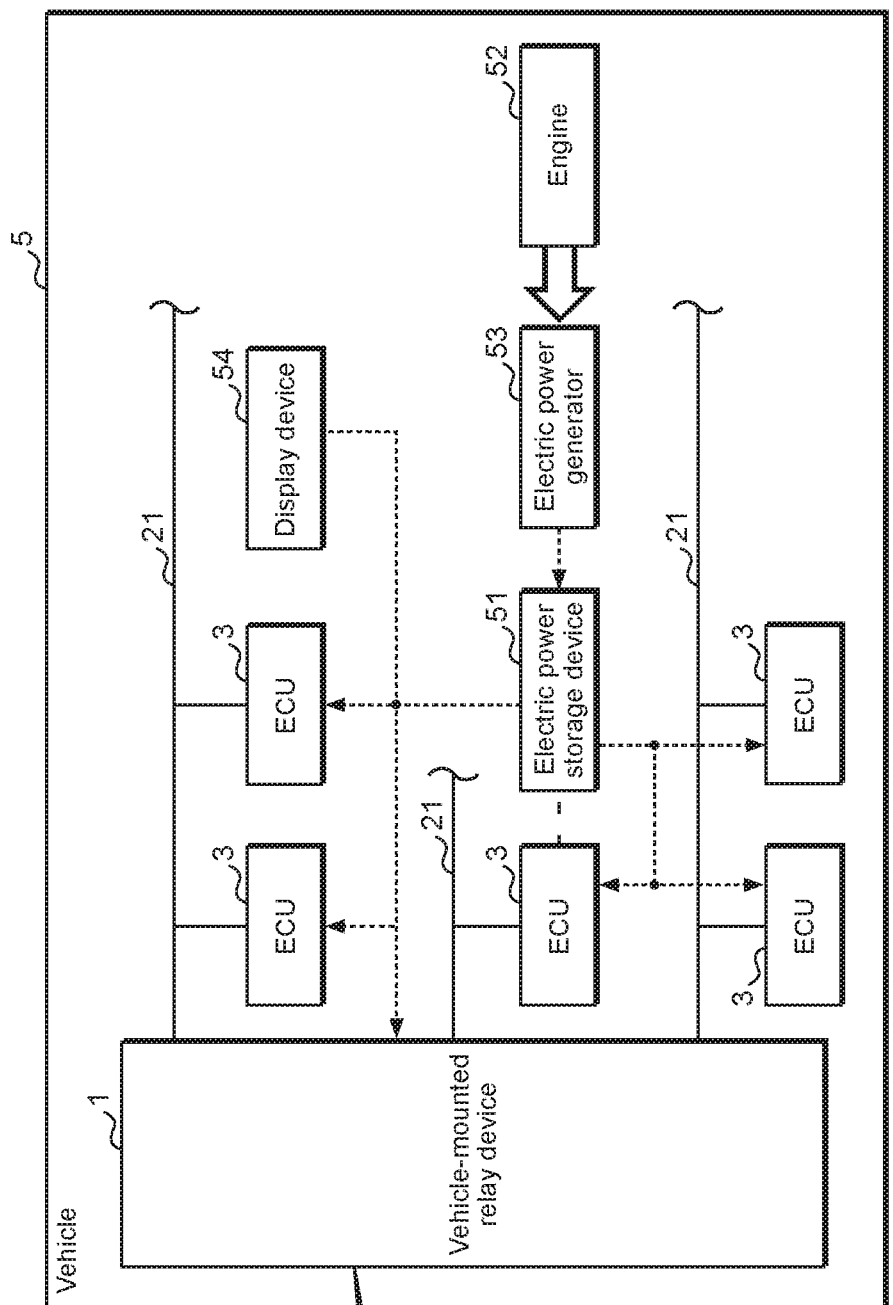
FIG. 1 is a block diagram illustrating a configuration of a communication system that includes a vehicle-mounted relay device according to Embodiment 1 of the present invention.

FIG. 1 is a block diagram illustrating a configuration of a communication system 2 that includes a vehicle-mounted relay device 1 according to Embodiment 1 of the present invention.

The communication system 2 shown in FIG. 1 is provided with the vehicle-mounted relay device 1, a plurality of ECUs 3 (vehicle-mounted control devices), a vehicle exterior device 4, and a plurality of systems of buses 21.

An electric power storage device 51, an engine 52, an electric power generator 53, and a display device 54 are installed in a vehicle 5. The vehicle-mounted relay device 1, the ECUs 3, and the buses 21 of the communication system 2 are installed in the vehicle 5.

Figure 2:
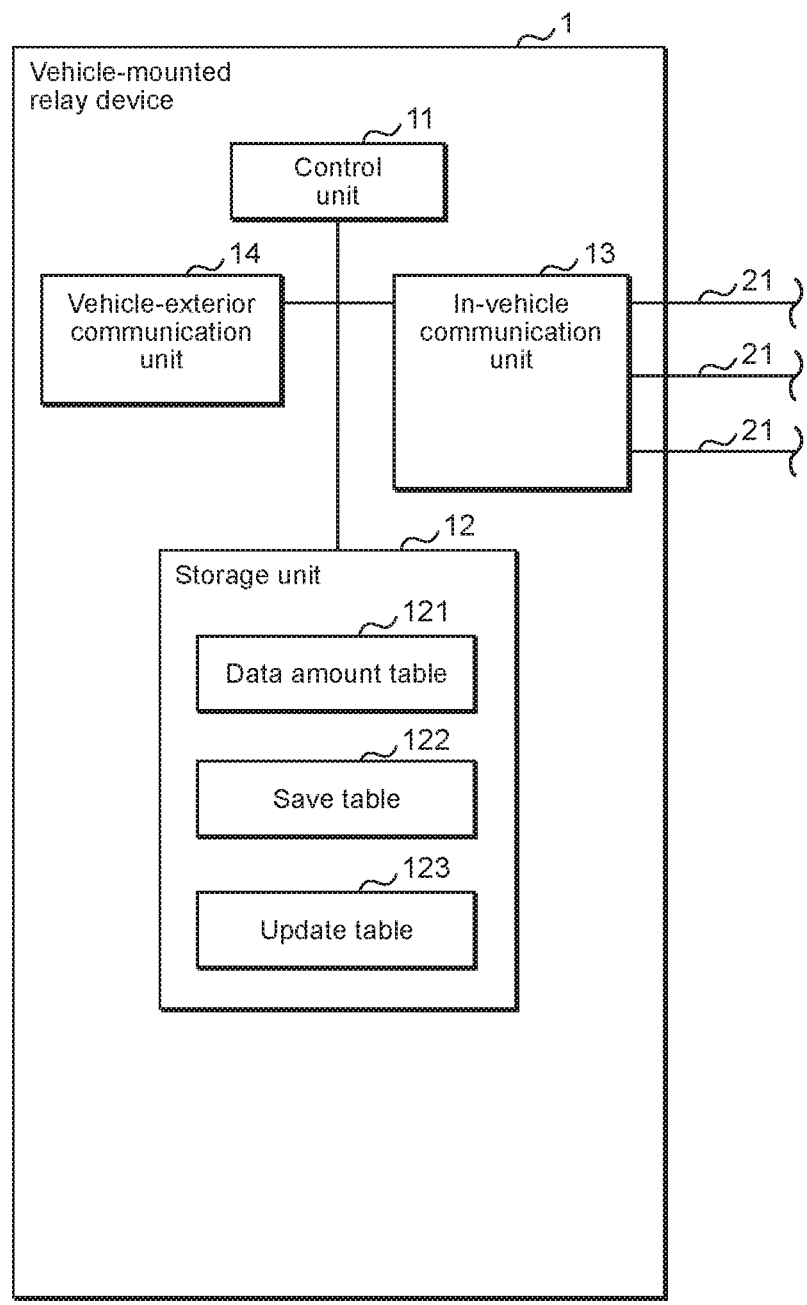
FIG. 2 is a block diagram illustrating a configuration of the vehicle-mounted relay device.

FIG. 2 is a block diagram illustrating a configuration of the vehicle-mounted relay device 1.

Figure 3:
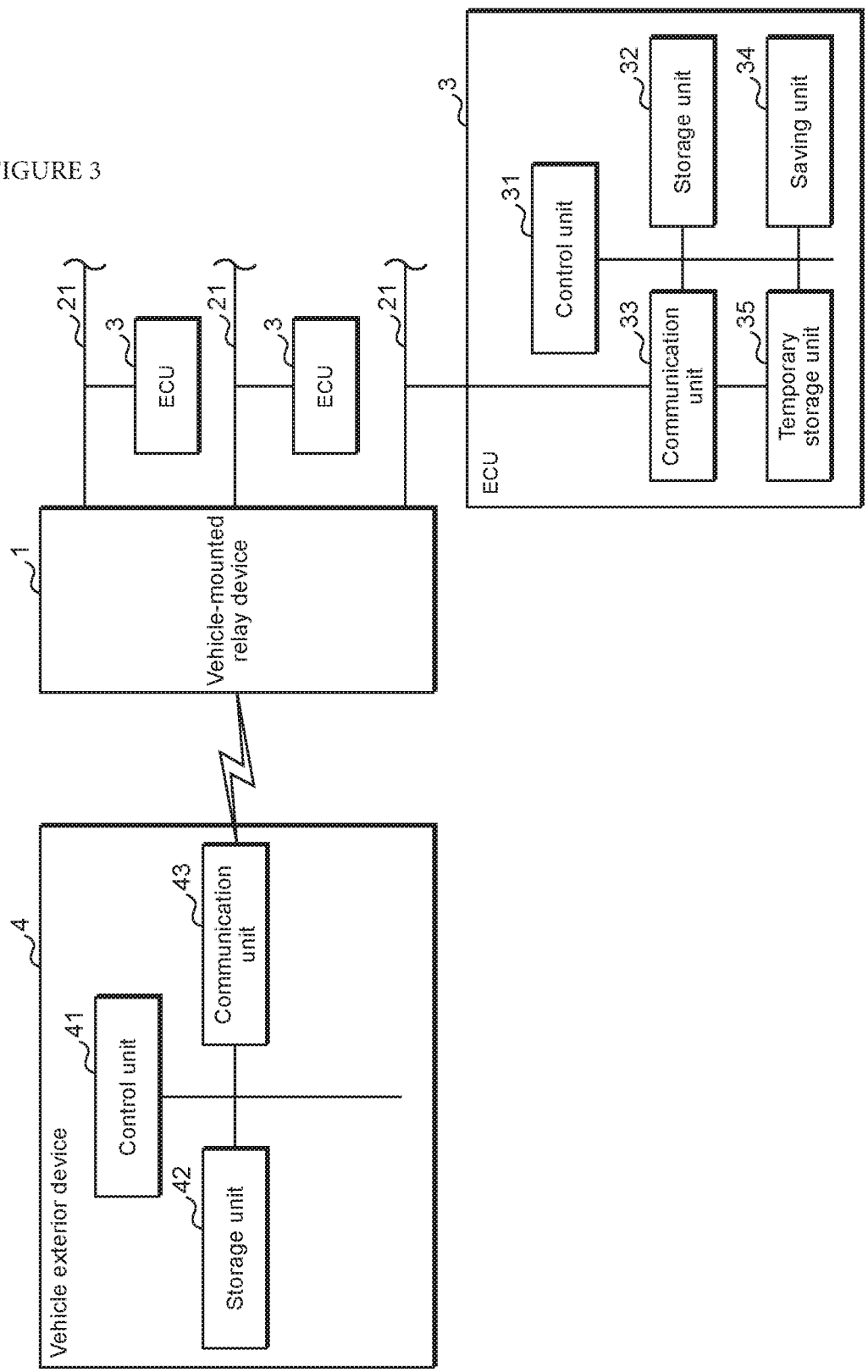
FIG. 3 is a block diagram illustrating configurations of ECUs and a vehicle exterior device that communicate with the vehicle-mounted relay device.

FIG. 3 is a block diagram illustrating configurations of the ECUs 3 and the vehicle exterior device 4 that communicate with the vehicle-mounted relay device 1.

The vehicle-mounted relay device 1 is provided with a control unit 11, a storage unit 12, an in-vehicle communication unit 13, and a vehicle-exterior communication unit 14.

Each ECU 3 is provided with a control unit 31, a storage unit 32 (data storage unit), a communication unit 33, a saving unit 34, and a temporary storage unit 35.

The vehicle exterior device 4 is provided with a control unit 41, a storage unit 42, and a communication unit 43.

First, the buses 21 will be described.

The buses 21 are part of a CAN (Controller Area Network), for example.

The following will describe the components of the vehicle 5.

The electric power storage device 51 is made up of a lead battery, a lithium-ion battery, a capacitor, or the like.

If the electric power storage device 51 is made up of a capacitor, it is assumed that the full charge amount Qfc of the electric power storage device 51 is expressed by following Formula (1).

$$Qfc = C \times V70 \tag{1}$$

where C is a capacitance of the capacitor, and V70 is a voltage that corresponds to 70% of an upper limit for the withstanding voltage of the capacitor.

The electric power generator 53 generates electric power in tandem with the engine 52. When the electric power generator 53 generates electric power, the electric power storage device 51 is charged.

The display device 54 is made up of, for example, a liquid crystal display serving as a part of a car navigation system, a seven-segment display serving as a part of a speedometer, or the like. The display device 54 is a vehicle-mounted electric device.

The vehicle-mounted relay device 1, the ECUs 3, the display device 54, and not-shown vehicle-mounted electric devices (such as a light source device and an air-conditioning device, for example) operate by being supplied with electric power from the electric power storage device 51 or from the electric power generator 53 in a state in which it is generating electric power.

In the present embodiment, it is assumed that the electric power generator 53 is in a state in which it is not generating electric power.

The following will describe the components of the ECUs 3.

The control units 31 of the ECUs 3 execute various types of processing in accordance with programs. As a result, the ECUs 3 control the operation of the vehicle-mounted device (such as the engine 52 or the display device 54).

The storage unit 32 is made up of a nonvolatile storage unit. The program that is to be followed by the control unit 31 is stored in the storage unit 32.

The program of the ECU 3 is updated at an appropriate timing (for example, when an automobile safety inspection is performed).

The communication unit 33 is connected to one of the buses 21.

Communication between the ECUs 3 that are connected to different buses 21 is relayed by the vehicle-mounted relay device 1.

The saving unit 34 is made up of a volatile or nonvolatile storage unit. At the time of a program update, a program (old program) that is stored in the storage unit 32 is written into the saving unit 34. In this way, for ease of description, the present embodiment describes an example in which each ECU 3 is provided with a place in which an old program is backed up, but the present invention is not limited to this.

The temporary storage unit 35 is made up of a volatile storage unit. The temporary storage unit 35 of the present embodiment has a storage capacity sufficient to be able to store a whole new program, but the present invention is not limited to this.

Hereinafter, one of the ECUs 3 is referred to as "stored-power monitoring ECU 3". The control unit 31 of the stored-power monitoring ECU 3 acquires results of detection performed by a voltage detection unit and a current detection unit that are not shown, and respectively detect a voltage and an electric current of the electric power storage device 51, and calculates the remaining amount of stored power in the electric power storage device 51, based on the acquired detection results.

The following will describe the components of the vehicle-mounted relay device 1.

The vehicle-mounted relay device 1 of the present embodiment is a gateway, for example.

The control unit 11 executes various types of processing in accordance with programs.

The storage unit 12 has stored programs that are to be followed by the control unit 11, a data amount table 121, a save table 122, and an update table 123.

In the data amount table 121, identification information of the ECUs 3, and the amounts of data of the programs that are respectively stored in the storage units 32 of the ECUs 3 (that is, the amounts of data of old programs) are stored in association with each other. The data amount table 121 has stored the amounts of data at the time of factory shipment. After the factory shipment, the amount of data of a new program that is stored in the storage unit 32 is written over and stored in the save table 122 every time a program is updated.

In the save table 122, a plurality of amounts of data, and the required amounts of stored power in the electric power storage device 51 that are respectively needed to read the programs having the amounts of data from the storage unit 32, compress the read programs, and write the compressed programs into the saving unit 34 (hereinafter, referred to as "amounts of stored power for save") are stored in association with each other.

By referencing the data amount table 121 based on the identification information of the ECU 3 whose program is to be updated, the amount of data of the old program can be obtained, and thus it is possible to estimate, by referencing the save table 122 based thereon, the amount of stored power that is needed to perform backup of the old program (amount of stored power for save).

In the update table 123, a plurality of amounts of data, and the required amounts of stored power in the electric power storage device 51 (hereinafter, referred to as "amounts of stored power for update") that are respectively needed to read the programs having the amounts of data from the temporary storage unit 35, expand the read programs, and write the expanded programs into the storage unit 32 are stored in association with each other.

It is possible to estimate the amount of stored power that is needed to update an old program into a new program (amount of stored power for update), by referencing the update table 123 based on the amount of data of the new program.

The save table 122 and the update table 123 have stored various types of information at the time of factory shipment. The combinations of values of the amounts of data and the amounts of stored power for save (or the amounts of stored power for update) that are stored in the save table 122 (or the update table 123) may differ for each ECU 3, or may be the same for all or some of the ECUs 3.

Note that, if the amounts of stored power for save are considered to be constant irrespective of the amounts of data of the programs, the data amount table 121 and the save table 122 may be omitted. In this case, it is sufficient for the update table 123 to have stored the amount of stored power for update in light of the amount of stored power for save.

Furthermore, in place of the save table 122 and the update table 123, a function for calculating the amount of stored power for save or the amount of stored power for update based on the amount of data of a program may be stored in the storage unit 12.

The in-vehicle communication unit 13 is connected to the buses 21.

The vehicle-exterior communication unit 14 has a wireless function.

The following will describe the components of the vehicle exterior device 4.

The vehicle exterior device 4 is made up of an automotive diagnostic server that is kept by an automobile dealer, for example.

The control unit 41 executes various types of processing in accordance with programs.

The storage unit 42 is made up of a nonvolatile storage unit. The storage unit 42 has stored programs that are to be followed by the control unit 41. Furthermore, the storage unit 42 has stored compressed programs (new programs) that are to be followed by the control units 31 of the ECUs 3. Furthermore, the identification information of the ECU 3 whose program is to be updated, and a new program are associated with each other and stored in the storage unit 42. The control unit 41 detects the amount of data of the new program stored in the storage unit 42.

The communication unit 43 has a wireless communication function. Wireless communication is possible between the communication unit 43 and the vehicle-exterior communication unit 14 of the vehicle-mounted relay device 1.

Note that the vehicle exterior device 4 may be able to communicate with an automotive diagnostic server that is kept by a manufacturer, for example.

Furthermore, the vehicle exterior device 4 is not limited to a server, and may be, for example, a transportable diagnostic device that is used by an automobile dealer.

The communication unit 43 and the vehicle-exterior communication unit 14 of the vehicle-mounted relay device 1 may perform wired communication.

Figure 4:
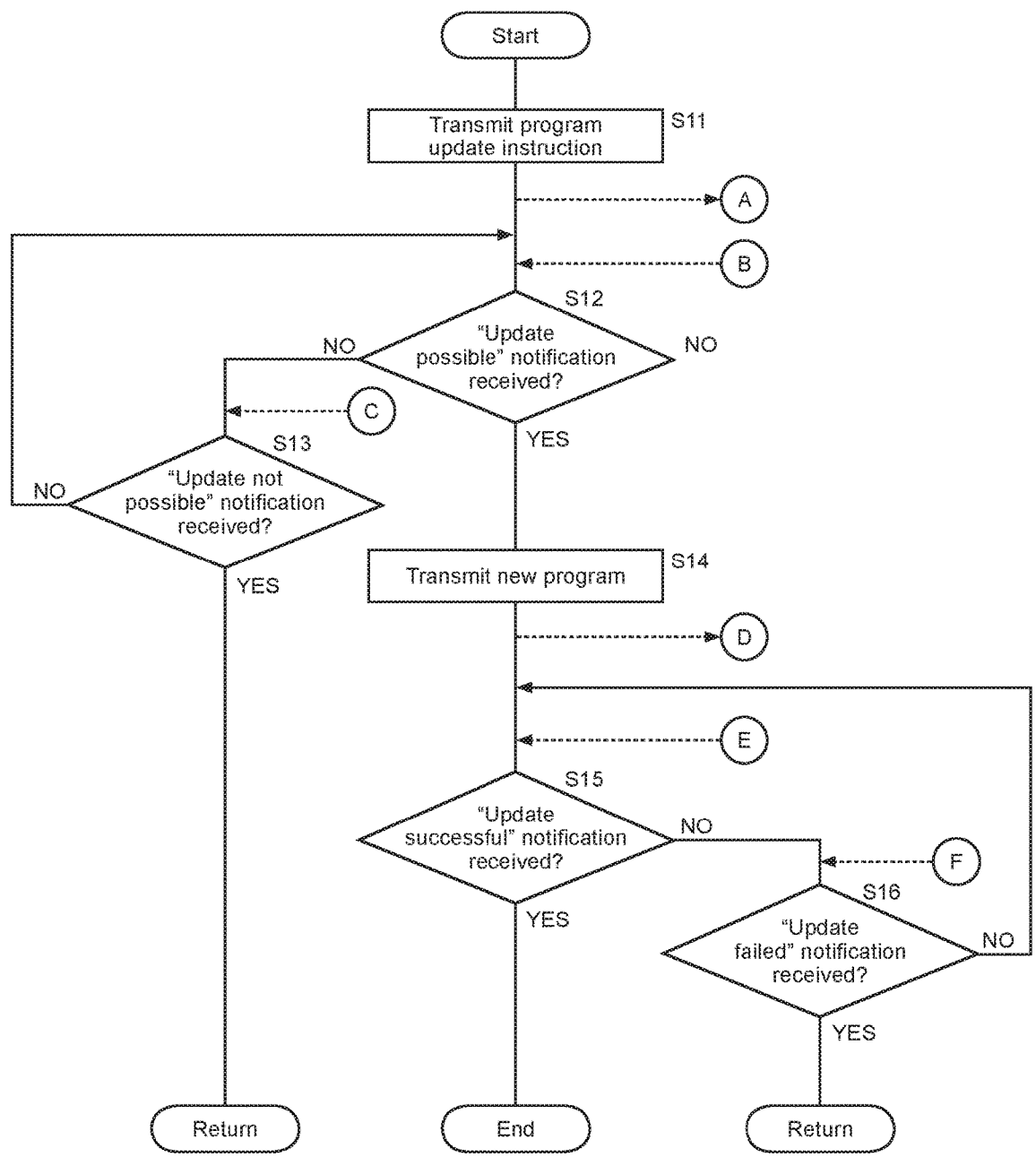
FIG. 4 is a flowchart of a procedure of program transmission processing that is executed in the vehicle exterior device.

FIG. 4 is a flowchart of a procedure of program transmission processing that is executed in the vehicle exterior device 4.

In the flowchart shown in FIG. 4 onward, transmission/reception of information to/from another device is indicated by arrows with dotted lines.

The control unit 41 transmits a program update instruction to update a program to the vehicle-mounted relay device 1 (step S11). The program update instruction includes identification information of the ECU 3 whose program is to be updated, and information indicating the amount of data of a new program.

Then, the control unit 41 determines whether or not an "update possible" notification showing that a program update is possible has been received (step S12), and if it has not yet been received (No in step S12), the control unit 41 determines whether or not an "update not possible" notification showing that a program update is not possible has been received (step S13). If no "update not possible" notification has been received (No in step S13), the control unit 41 returns the procedure to step S12.

If an "update possible" notification has been received (Yes in step S12), the control unit 41 transmits the new program to the vehicle-mounted relay device 1 (step S14).

Then, the control unit 41 determines whether or not an "update successful" notification showing that the program was successfully updated has been received (step S15), and if it has not yet been received (No in step S15), the control unit 41 determines whether or not an "update failed" notification showing that the program was not successfully updated has been received (step S16). If no "update failed" notification has been received (No in step S16), the control unit 41 returns the procedure to step S15.

If an "update not possible" notification has been received (Yes in step S13), or if an "update failed" notification has been received (Yes in step S16), the control unit 41 waits for, for example, a predetermined waiting time, and then executes the processing in step S11 again.

If an "update successful" notification has been received (Yes in step S15), the control unit 41 ends the program transmission processing.

The program update instruction functions as a "data write instruction" in the embodiments of the present invention, and the new program functions as "write data" in the embodiments of the present invention.

If an "update successful" notification has been received, and the program transmission processing is complete, the control unit 41 updates the content of the data amount table 121 (specifically, writes the amount of data of the new program over the amount of data of the old program).

Figure 5:
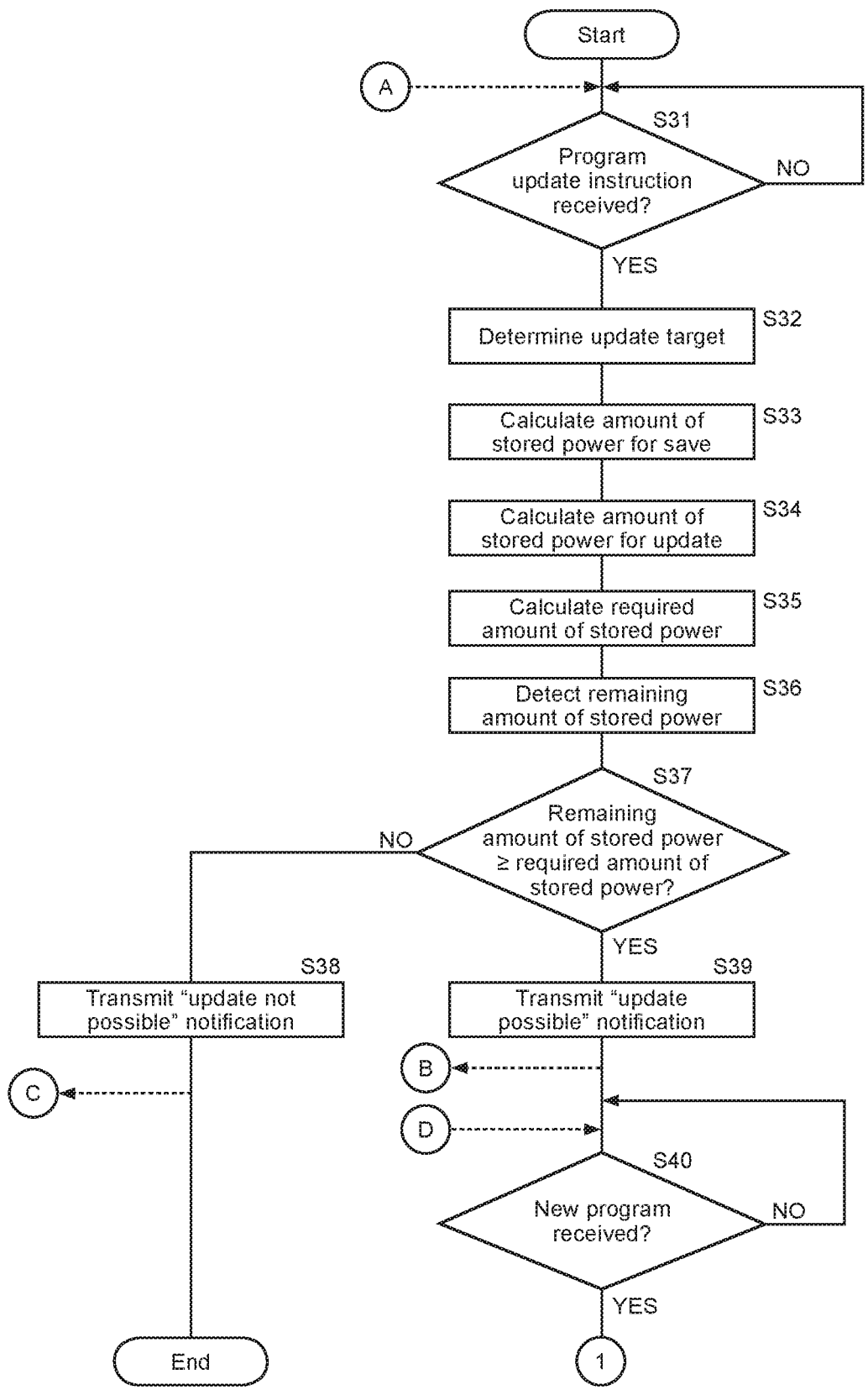
FIG. 5 is a flowchart of a procedure of program relay processing that is executed in the vehicle-mounted relay device.
Figure 6:
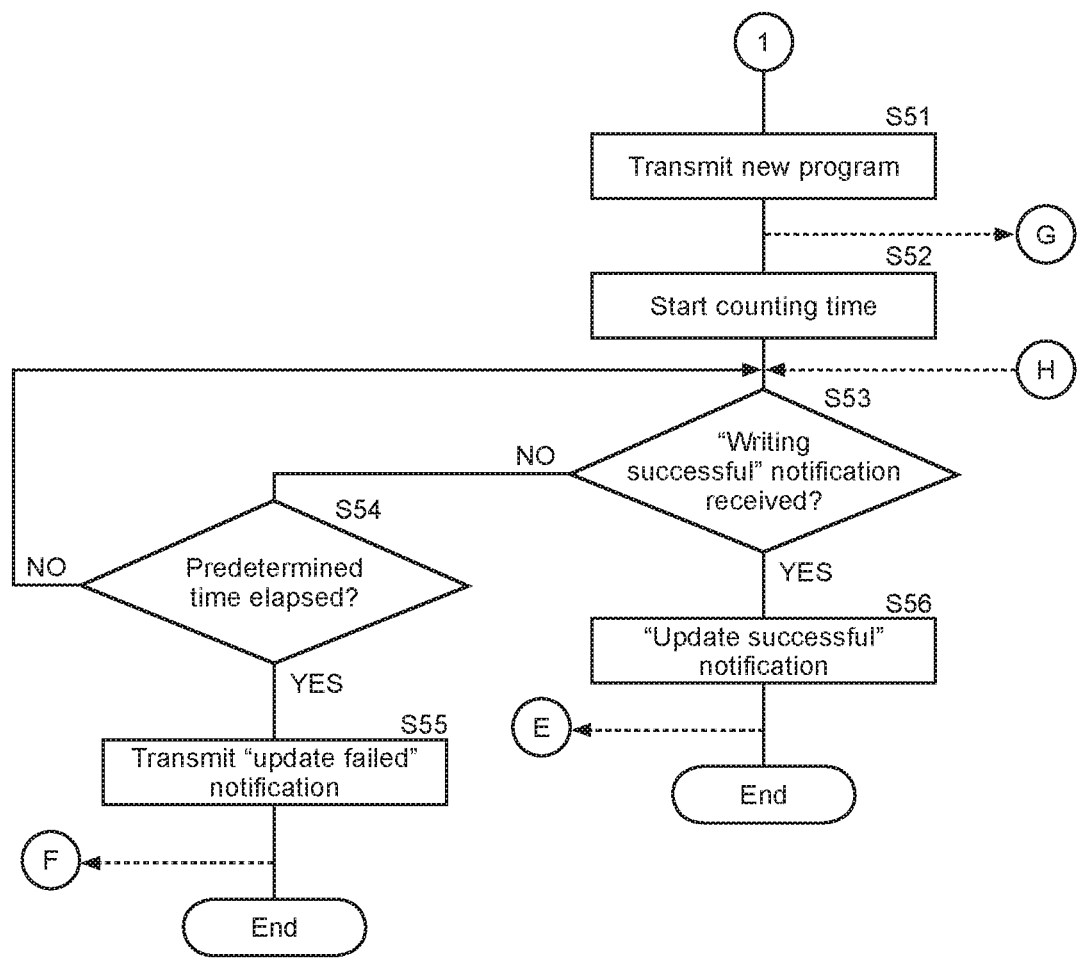
FIG. 6 is a flowchart of the procedure of the program relay processing that is executed in the vehicle-mounted relay device.

FIGS. 5 and 6 are flowcharts of a procedure of program relay processing that is executed in the vehicle-mounted relay device 1.

As shown in FIG. 5, the control unit 11 determines whether or not a program update instruction has been received via the vehicle-exterior communication unit 14 (step S31), and if it has not been received (No in step S31), the control unit 11 executes the processing in step S31 again.

If a program update instruction has been received (Yes in step S31), the control unit 11 decides the ECU 3 whose program is to be updated (hereinafter, referred to as "update target ECU 3") based on the identification information of the EUC 3 that is included in the received program update instruction (step S32). The update target ECU 3 functions as a "writing target" in the embodiments of the present invention, and the control unit 11 that executes the processing in step S32 functions as a "writing deciding means" in the embodiments of the present invention.

Then, the control unit 11 references the data amount table 121 and the save table 122 based on the identification information of the update target EUC 3, and calculates the amount of stored power for save (step S33). Furthermore, the control unit 11 references the update table 123 based on the amount of data that is indicated by the information included in the program update instruction, and calculates the amount of stored power for update (step S34). Then, the control unit 11 calculate the required amount of stored power in the electric power storage device 51 that is needed to update the program, by adding the amount of stored power for save to the amount of stored power for update (step S35). The control unit 11 that executes the processing in step S35 functions as a "writing calculation means" in the embodiments of the present invention.

Furthermore, the control unit 11 detects the remaining amount of stored power in the electric power storage device 51 (step S36). For this, the control unit 11 communicates with the stored-power monitoring ECU 3 via the in-vehicle communication unit 13 to request the stored-power monitoring ECU 3 to detect the remaining amount of stored power in the electric power storage device 51. At this time, the stored-power monitoring ECU 3 calculates the remaining amount of stored power in the electric power storage device 51 based on results of detections performed by the voltage detection unit and the current detection unit, and gives the calculation result to the vehicle-mounted relay device 1. The control unit 11 that executes the processing in step S36 functions as a "remaining amount detection means" in the embodiments of the present invention.

Then, the control unit 11 determines whether or not the remaining amount of stored power detected in step S36 is equal to or greater than the required amount of stored power calculated in step S35 (step S37). The control unit 11 that executes the processing in step S37 functions as a "writing determination means" in the embodiments of the present invention.

If "remaining amount of stored power < required amount of stored power" is met (No in step S37), then the program update is not possible. Therefore, the control unit 11 transmits the "update not possible" notification to the vehicle exterior device 4 via the vehicle-exterior communication unit 14 (step S38), and the program relay processing ends.

If "remaining amount of stored power ≥ required amount of stored power" is met (Yes in step S37), then the program update is possible. Therefore, the control unit 11 transmits the "update possible" notification to the vehicle exterior device 4 via the vehicle-exterior communication unit 14 (step S39).

Then, the control unit 11 determines whether or not the new program has been received via the vehicle-exterior communication unit 14 (step S40), and if it has not yet been received (No in step S40), the control unit 11 executes the processing in step S40 again.

If a new program has been received (Yes in step S40), as shown in FIG. 6, the control unit 11 communicates with the update target ECU 3 that was decided in step S32 via the in-vehicle communication unit 13, and transmits the received new program to the update target ECU 3 (step S51). The control unit 11 that executes the processing of S51 functions as a "writing starting means" in the embodiments of the present invention.

Furthermore, the control unit 11 starts counting the elapsed time from a point in time when the transmission of the new program is complete (step S52).

Then, the control unit 11 determines whether or not a "writing successful" notification showing that the program was successfully written has been received (step S53), and if it has not yet been received (No in step S53), the control unit 11 determines whether or not a predetermined time has elapsed from the point in time when the transmission of the new program is complete (that is, the elapsed time from the start of the counting of time in step S52 exceeds the predetermined time) (step S54). If the predetermined time has not yet elapsed (No in step S54), the control unit 11 returns the procedure to step S53.

Here, the predetermined time is longer than a minimum time that is needed from transmission of a new program to completion of update of the program. In the present embodiment, the value of the predetermined time is constant, but there is no limitation to this.

If the predetermined time has elapsed (Yes in step S54), the control unit 11 transmits the "update failed" notification to the vehicle exterior device 4 via the vehicle-exterior communication unit 14 (step S55), and the program relay processing ends.

If a "writing successful" notification has been received (Yes in step S53), the control unit 11 transmits the "update successful" notification to the vehicle exterior device 4 via the vehicle-exterior communication unit 14 (step S56), and the program relay processing ends.

In the present embodiment, an example in which the control unit 11 transmits a whole new program at once to the update target ECU 3 is described, but the present invention is not limited to this. In particularly, if the storage capacity of the temporary storage unit 35 of the update target ECU 3 is smaller than the amount of data of a new program, the new program needs to be divided and transmitted sequentially.

Figure 7:
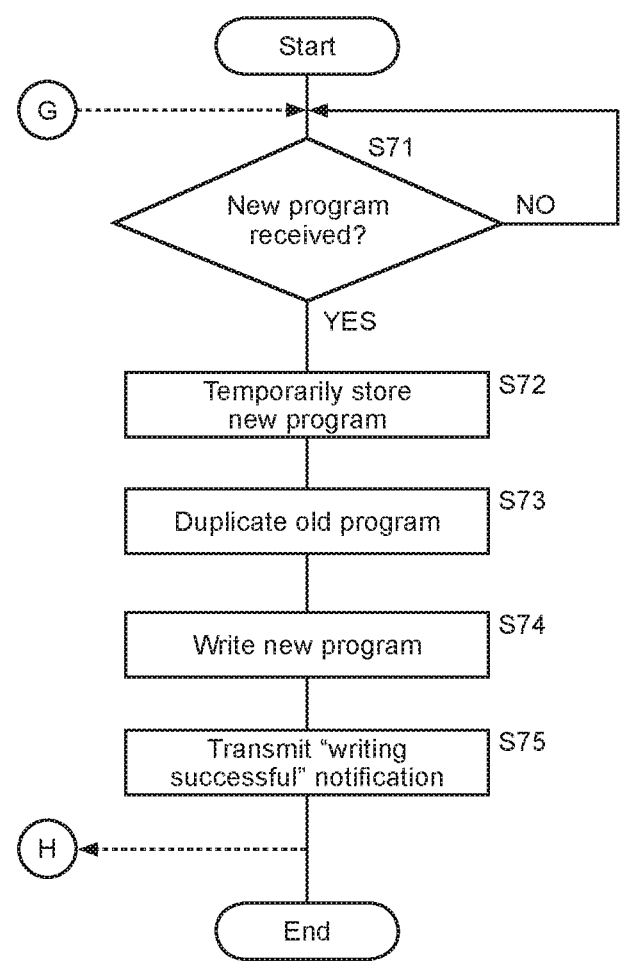
FIG. 7 is a flowchart of a procedure of program writing processing that is executed in an ECU.

FIG. 7 is a flowchart of a procedure of the program writing processing that is executed in the ECU 3.

The control unit 31 determines whether or not a new program has been received (step S71), and if it has not yet been received (No in step S71), the control unit 31 executes the processing in step S71 again.

If the new programs have been received (Yes in step S71), the control unit 31 writes the received new program into the temporary storage unit 35 (step S72). In the present embodiment, because the received new program is compressed, the predetermined time for writing the new program into the temporary storage unit 35 and the consumption in the amount of stored power in the electric power storage device 51 are negligible.

Furthermore, the control unit 31 compresses the old program stored in the storage unit 32, and copies the compressed program to the saving unit 34 (step S73). The processing in step S73 duplicates the old program.

After the processing in step S73 ends, the control unit 31 expands the new program stored in the temporary storage unit 35, and writes the expanded program into the storage unit 32 (step S74).

After the processing in step S74 ends, the control unit 31 transmits the "writing successful" notification to the vehicle-mounted relay device 1 (step S75), and the program writing processing ends.

In the communication system 2 that is provided with the vehicle-mounted relay device 1 as described above, update of a program does not start if the remaining amount of stored power in the electric power storage device 51 is insufficient. Accordingly, it is possible to suppress failures in writing a new program into the storage unit 32 of an ECU 3 due to electric power shortage.

Moreover, if the remaining amount of stored power in the electric power storage device 51 is insufficient, neither the vehicle-mounted relay device 1 transmits a new program to an ECU 3 nor the vehicle exterior device 4 transmits a new program to the vehicle-mounted relay device 1. In other words, it is possible to suppress the waste of electric power that is caused by performing unnecessary communication.

Embodiment 2

Figure 8:
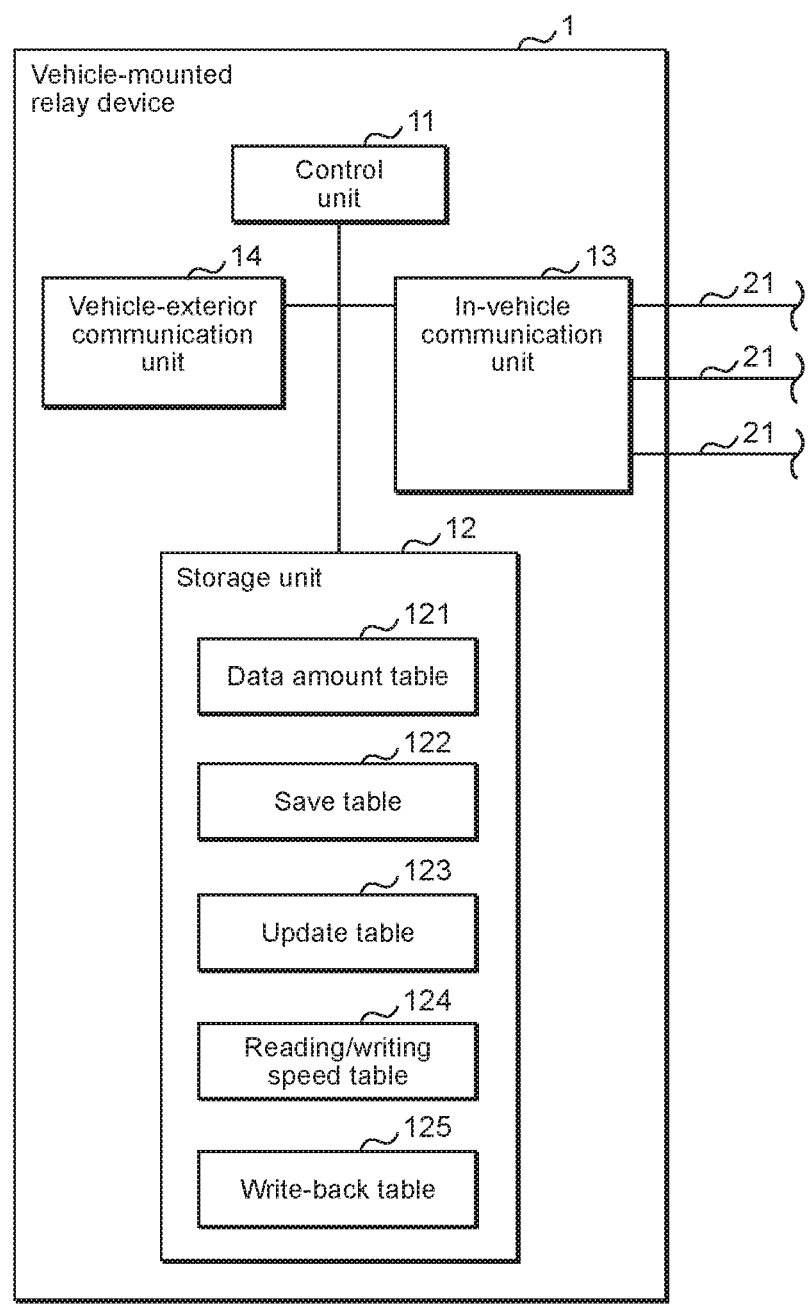
FIG. 8 is a block diagram illustrating a configuration of a vehicle-mounted relay device according to Embodiment 2 of the present invention.

FIG. 8 is a block diagram illustrating a configuration of a vehicle-mounted relay device 1 according to Embodiment 2 of the present invention. FIG. 8 corresponds to FIG. 2 of Embodiment 1.

The vehicle-mounted relay device 1 and a communication system 2 of the present embodiment have substantially the same configurations as the vehicle-mounted relay device 1 and the communication system 2 of Embodiment 1. Hereinafter, differences from Embodiment 1 will be described, and the same reference numerals are given to the structures that correspond to those of Embodiment 1, and their description is omitted.

One of the ECUs 3 other than the stored-power monitoring ECU 3 lets the display device 54 display a predetermined message. Hereinafter, this ECU 3 is referred to as "display ECU 3". The display device 54 functions as a notification device in the embodiments of the present invention. Note that the notification device may also be, for example, a light source device such as a room lamp or a head light, or an audio output device that serves as a part of a car navigation system or an audio instrument. Furthermore, the notification device may also be the vehicle exterior device 4.

A reading/writing speed table 124 and a write-back table 125 are further stored in the storage unit 12 of the vehicle-mounted relay device 1.

In the reading/writing speed table 124, identification information of the ECUs 3, and reading/writing speeds of the respective ECUs 3 are stored in association with each other. "Reading/writing speed" refers to the amount of data that can be read/written by the control unit 31 from/into the units from the storage unit 32 to the temporary storage unit 35 per unit time.

Therefore, by referencing the reading/writing speed table 124 based on the identification information of the ECU 3 whose program is to be updated, it is possible to obtain the reading/writing speed of the ECU 3 whose program is to be updated. Based on the obtained reading/writing speed and the elapsed time from when a new program is transmitted to the ECU 3, it is possible to estimate the amount of data of the program that has been read/written in the ECU 3 after the new program was transmitted to the ECU 3.

If the amount of data of the program that has been read/written in the ECU 3 after the new program was transmitted to the ECU 3, the amount of data of the old program that is to be copied to the saving unit 34, and the amount of data of the new program that is to be written into the storage unit 32 are known, it is possible to estimate the amount of data of the old program that has already been copied to the saving unit 34, and the amount of data of the new program that has already been written into the storage unit 32.

If the amount of data of the old program that is to be copied to the saving unit 34, the amount of data of the new program that is to be written into the storage unit 32, the amount of data of the old program that has already been copied to the saving unit 34, and the amount of data of the new program that has already been written into the storage unit 32 are known, the remaining amount of data of the old program and the remaining amount of data of the new program are known.

The remaining amount of data of an old program refers to the amount of data of an old program to be copied to the saving unit 34 that has not yet been copied to the saving unit 34. The remaining amount of data of an old program can be obtained by subtracting the amount of data of the old program that has already been copied to the saving unit 34 from the amount of data of the old program that is to be copied to the saving unit 34 (total amount of data of the old program).

The remaining amount of data of a new program refers to the amount of data of a new program to be written into the storage unit 32 that has not yet been written into the storage unit 32, and can be obtained by subtracting the amount of data of the new program that has already been written into the storage unit 32 from the amount of data of the new program that is to be written into the storage unit 32 (total amount of data of the new program).

Meanwhile, it is possible to estimate a time that is needed to complete the program update from the reception of the new program in the ECU 3 via the backup of the old data, based on the reading/writing speed of the ECU 3 whose program is to be updated, the amount of data of the old program that is to be copied to the saving unit 34, and the amount of data of the new program that is to be written into the storage unit 32. The time thus estimated may also be set as the predetermined time used in the processing in step S54 shown in FIG. 6 of Embodiment 1.

In the write-back table 125, a plurality of amounts of data, and the required amounts of stored power in the electric power storage device 51 that are respectively needed to read the programs having the amounts of data from the saving unit 34, expand the read programs, and write back the expanded programs to the storage unit 32 (hereinafter, referred to as "amount of stored power for write back") are stored in association with each other.

By referencing the write-back table 125 based on the amount of data of the old program, it is possible to estimate the amount of stored power that is needed to restore the old program in case of a failed update of the program (amount of stored power for write back).

The reading/writing speed table 124 and the write-back table 125 have stored various types of information at the time of factory shipment.

Figure 9:
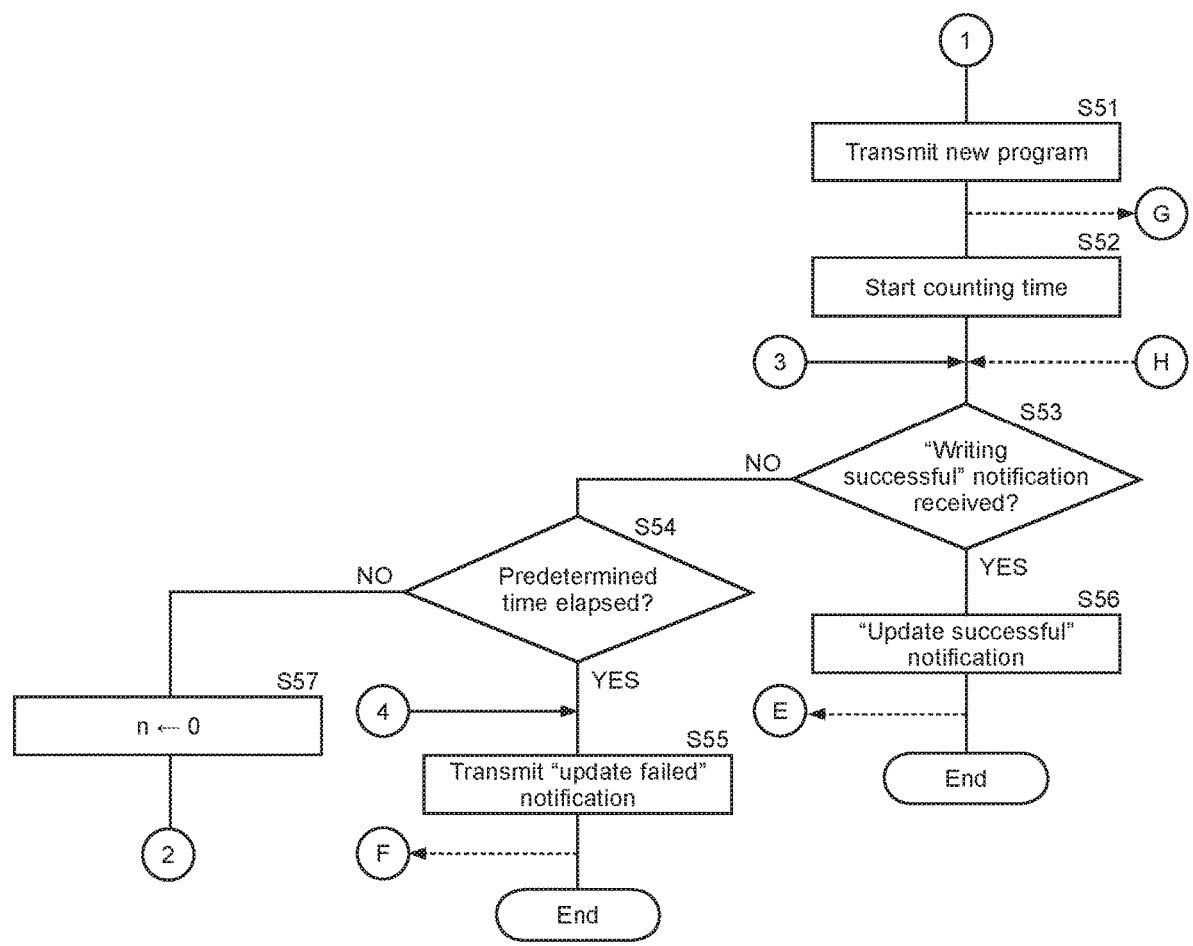
FIG. 9 is a flowchart of a procedure of program relay processing that is executed in the vehicle-mounted relay device.
Figure 10:
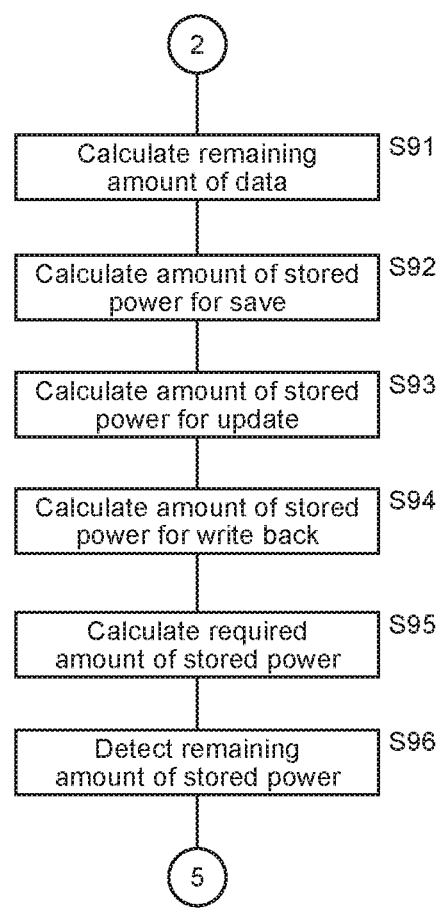
FIG. 10 is a flowchart of the procedure of the program relay processing that is executed in the vehicle-mounted relay device.
Figure 11:
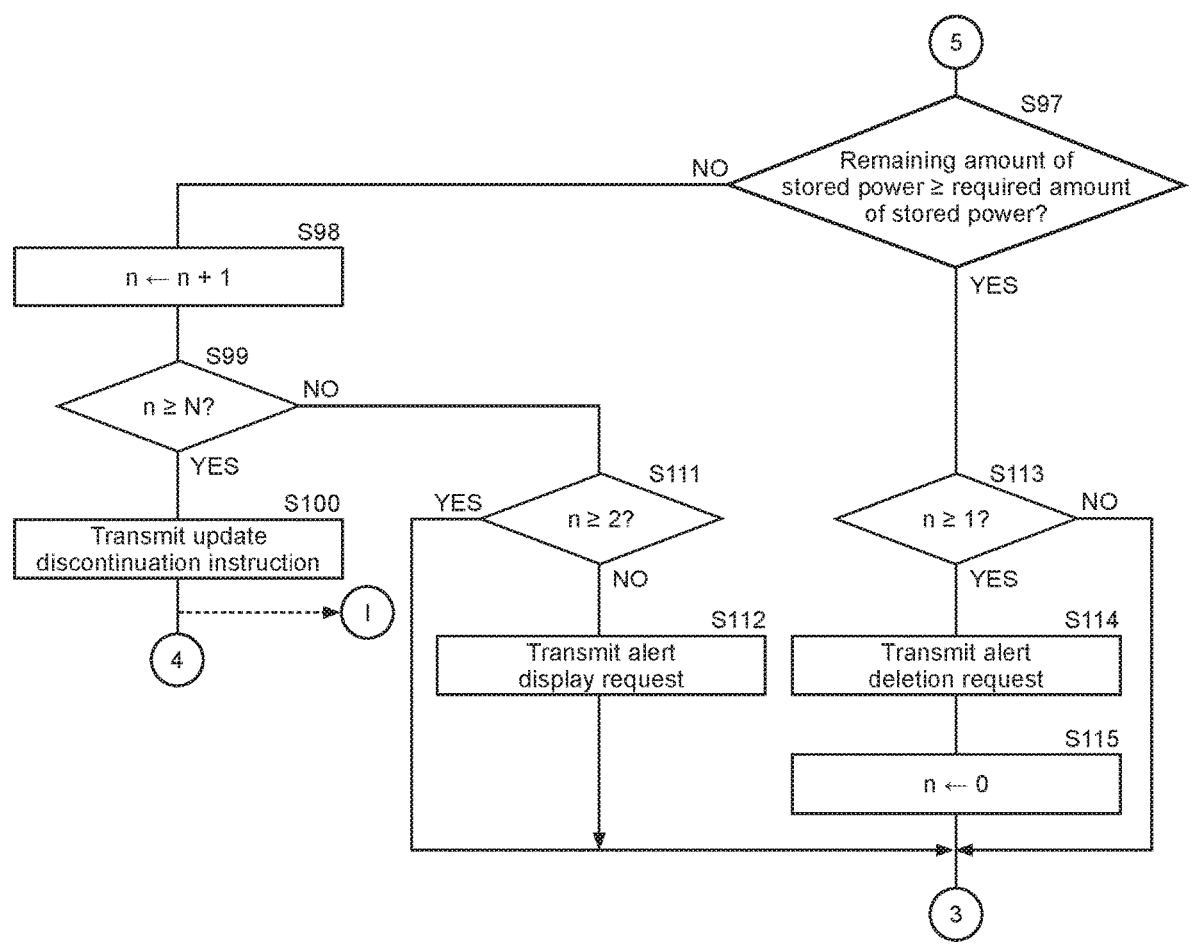
FIG. 11 is a flowchart of the procedure of the program relay processing that is executed in the vehicle-mounted relay device.

FIGS. 9 to 11 are flowcharts of a procedure of program relay processing that is executed in the vehicle-mounted relay device 1.

The program relay processing of the present embodiment includes the same processing (not shown) as in steps S31 to S40 shown in FIG. 5 of Embodiment 1.

The processes of steps S51 to S56 shown in FIG. 9 are identical with steps S51 to S56 shown in FIG. 6 of Embodiment 1. Note that, if the determination in step S54 shows "No", the control unit 11 executes processing in step S57 that will be described as follows.

The control unit 11 resets a variable n to "0" (step S57).

After the processing in step S57 ends, as shown in FIG. 10, the control unit 11 references the reading/writing speed table 124 based on the identification information of the update target ECU 3, and calculates, based on the elapsed time from a point in time when the transmission of the new program is complete (the elapsed time from the start of the counting of time in step S52), and the amounts of data of the old program and the new program, the remaining amounts of data of the old program and the new program (step S91).

If the processing in step S91 is executed when, in the update target ECU 3, the new program is still being written into the temporary storage unit 35 or the old program is still being copied to the saving unit 34 (that is, when writing of the new program into the storage unit 32 has not yet started), the remaining amount of data of the new program that is estimated in step S91 is exactly equal to the data amount of the new program. On the other hand, after the start of writing of the new program into the storage unit 32 (that is, after the old program is completely copied to the saving unit 34), the remaining amount of data of the old program that is estimated in step S91 is "0".

After the processing in step S91 ends, the control unit 11 references the save table 122 based on the remaining amount of data of the old program that was estimated in step S91, and calculates the amount of stored power for save (step S92). Furthermore, the control unit 11 references the update table 123 based on the remaining amount of data of the new program that was estimated in step S91, and calculates the amount of stored power for update (step S93). Furthermore, the control unit 11 references the write-back table 125 based on the amount of data of the old program, and calculates the amount of stored power for write back (step S94).

Then, by adding up the amount of stored power for save, the amount of stored power for update, and the amount of stored power for write back, which are the calculation results of steps S92 to S94, the control unit 11 calculates the required amount of stored power in the electric power storage device 51 that is needed to update the program that has not been updated (step S95). The control unit 11 that executes the processing in steps S92 to S95 functions as a "writing recalculation means" in the embodiments of the present invention.

Furthermore, the control unit 11 detects the remaining amount of stored power in the electric power storage device 51 by performing the same processing as in step S36 shown in FIG. 5 of Embodiment 1 (step S96). The control unit 11 that executes the processing in step S96 functions as a "redetecting means" of the embodiment of the present invention.

Then, as shown in FIG. 11, the control unit 11 determines whether or not the remaining amount of stored power detected in step S96 is equal to or greater than the required amount of stored power calculated in step S95 (step S97).

If "remaining amount of stored power < required amount of stored power" is met (No in step S97), then there is a likelihood that the program update cannot be continued. However, there is also a likelihood that, in addition to the update target ECU 3, a light source device, an air-conditioning device, or the like operates for example, and a significant change in voltage of the electric power storage device 51 due to the operation of such a device may lead a wrong determination that the remaining amount of stored power is smaller than the required amount of stored power.

Accordingly, the control unit 11 increments the variable n by "1" (step S98), and determines whether or not the variable n is equal to or greater than a constant N (step S99). Here, the constant N is an integer that is equal to or greater than 2, and is stored in advance in the storage unit 12. In the present embodiment, N is equal to 3.

If n≥N is met (Yes in step S99), then it has been determined N times in a row that the remaining amount of stored power is smaller than the required amount of stored power, and thus it is conceivable that the program update cannot be continued. Accordingly, the control unit 11 transmits an update discontinuation instruction to discontinue the update of the data to the update target ECU 3 via the in-vehicle communication unit 13 (step S100), and shifts the procedure to step S55 shown in FIG. 9. Note that, instead of to step S55, the control unit 11 may shift the procedure to step S38 shown in FIG. 5 after the processing in step S100 ends.

The control unit 11 that executes the processing of step S97 functions as a "writing continuation determination means" in the embodiments of the present invention. The control unit 11 that executes the processing in step S100 functions as a "writing discontinuation means" in the embodiments of the present invention.

If n<N is met (No in step S99), then it is conceivable that the program update can be continued. Note however that, since it has been determined at least once that the remaining amount of stored power is smaller than the required amount of stored power, it is necessary to alert an operator.

Accordingly, as shown in FIG. 11, the control unit 11 determines whether or not the variable n is equal to or greater than "2" (step S111), and if n≤1 is met (No in step S111), then the control unit 11 communicates with the display ECU 3 via the in-vehicle communication unit 13, and transmits an alert display request to display a predetermined alert message (step S112).

The display ECU 3 that has received the alert display request controls the display device 54 to display the predetermined alert message (for example, "program update may be interrupted due to shortage of remaining amount of stored power in electric power storage device 51"). As a result, the control unit 11 that executes the processing in step S112 functions as a "notification control means" in the embodiments of the present invention.

The operator who has viewed the alert message may, for example, turn off the light source device or the air-conditioning device that is operating, so as to reduce the electric power consumption of the electric power storage device 51.

Note that if a light source device is used as the notification device, the light source device only needs to blink on and off in a predetermined blinking pattern, for example. If a vehicle-mounted audio output device is used as the notification device, the vehicle-mounted audio output device only needs to audio-output the predetermined alert message.

After the processing in step S112 ends, or if n≥2 is met (Yes in step S111), the control unit 11 shifts the procedure to step S53 shown in FIG. 9.

As shown in FIG. 11, if "remaining amount of stored power ≥ required amount of stored power" is met (Yes in step S97), then the program update can be continued.

Accordingly, the control unit 11 determines whether or not the variable n is equal to or greater than "1" (step S113), and if n≥1 is met (Yes in step S113), then the control unit 11 communicates with the display ECU 3 via the in-vehicle communication unit 13, and transmits an alert deletion request to delete the predetermined alert message (step S114).

The display ECU 3 that has received the alert deletion request controls the display device 54 to delete the alert message.

After the processing in step S114 ends, the control unit 11 resets the variable n to "0" (step S115).

After the processing in step S115 ends, or if n=0 is met (No in step S113), the control unit 11 shifts the procedure to step S53 shown in FIG. 9.

Figure 12:
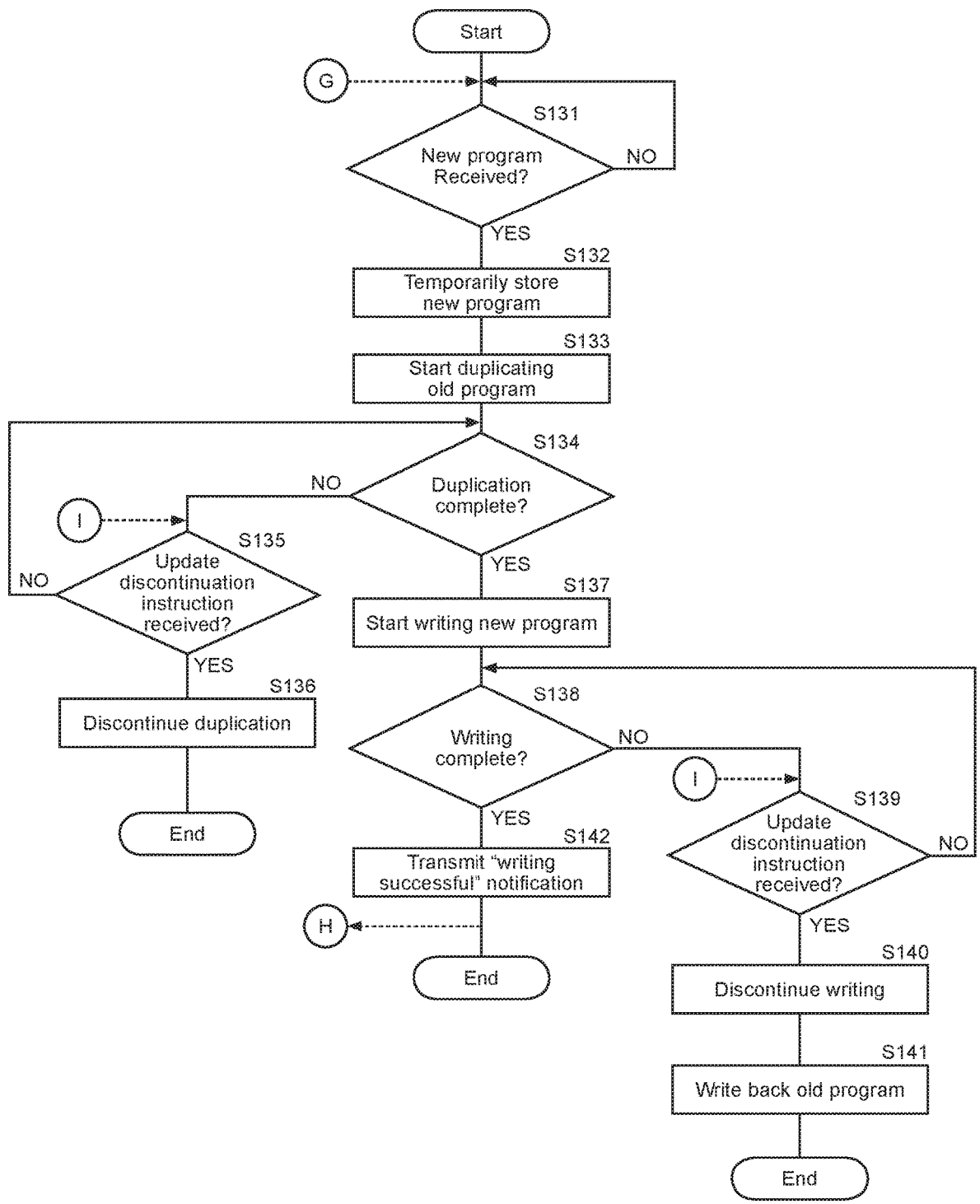
FIG. 12 is a flowchart of a procedure of program writing processing that is executed in an ECU.

The FIG. 12 is a flowchart of a procedure of program writing processing that is executed in the ECU 3.

As shown in FIG. 12, the control unit 31 determines whether or not a new program has been received (step S131), and if it has not been received (No in step S131), the control unit 31 executes the processing of step S131 again.

If a new program has been received (Yes in step S131), the control unit 31 writes the received new program into the temporary storage unit 35 (step S132).

Furthermore, the control unit 31 starts compressing the old program that is stored in the storage unit 32 and copying the old program to the saving unit 34, in order to duplicate the old program (step S133).

The control unit 31 determines whether or not the duplication of the old program (that is, copying of the old program to the saving unit 34) is complete (step S134).

If the copying of the old program to the saving unit 34 is not complete (No in step S134), the control unit 31 determines whether or not an update discontinuation instruction has been received (step S135), and if it has not been received (No in step S135), the control unit 31 returns the procedure to step S134.

If an update discontinuation instruction has been received (Yes in step S135), the control unit 31 discontinues the duplication of the old program (step S136), and the program writing processing ends.

If the copying of the old program to the saving unit 34 is complete (Yes in step S134), the control unit 31 starts expanding the new program stored in the temporary storage unit 35, and writing the expanded program into the storage unit 32 (step S137).

The control unit 31 determines whether or not the writing of the new program to the storage unit 32 is complete (step S138).

If the writing of the new program into the storage unit 32 is not complete (No in step S138), the control unit 31 determines whether or not an update discontinuation instruction has been received (step S139), and if it has not been received (No in step S139), the control unit 31 returns the procedure to step S138.

If an update discontinuation instruction has been received (Yes in step S139), the control unit 31 discontinues writing of the new program into the storage unit 32 (step S140).

Lastly, the control unit 31 expands the duplicated old program, and writes back the expanded program to the storage unit 32 (step S141), and the program writing processing ends.

The required amount of stored power that is obtained by the processing in step S95 includes the amount of stored power for write back that is needed to write back the old program to the storage unit 32 in case of a failed update of the program. Accordingly, it is possible to execute the processing in step S141.

Note that a configuration is also possible in which the required amount of stored power that is to be obtained by the processing in step S95 does not include the amount of stored power for write back. In this case, after the processing in step S140 ends, the control unit 31 ends the program writing processing without performing the processing in step S141.

When the writing of the new program into the storage unit 32 is complete (Yes in step S138), the control unit 31 transmits a "writing successful" notification to the vehicle-mounted relay device 1 (step S142), and the program writing processing ends.

The communication system 2 that is provided with the vehicle-mounted relay device 1 as described above has the same functions and effects as those of Embodiment 1.

Furthermore, in the communication system 2, the remaining amount of stored power in the electric power storage device 51 is monitored continuously after the start of the update of a program. When the remaining amount of stored power in the electric power storage device 51 becomes insufficient, the program update is discontinued. Thereafter, the old program is written back to the storage unit 32, and thus the operation of the ECU 3 does not pose any problem.

Embodiment 3

Figure 13:
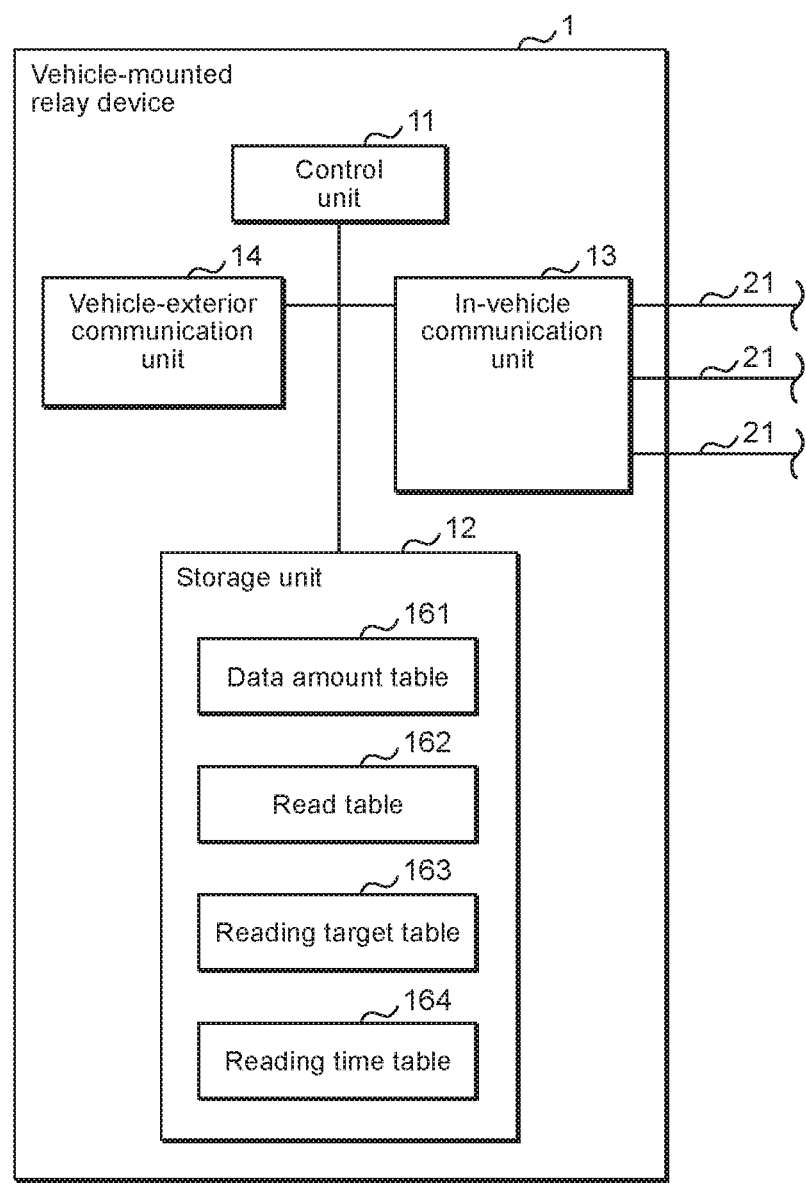
FIG. 13 is a block diagram illustrating a configuration of a vehicle-mounted relay device according to Embodiment 3 of the present invention.

FIG. 13 is a block diagram illustrating a configuration of a vehicle-mounted relay device according to Embodiment 3 of the present invention. FIG. 13 corresponds to FIGS. 2 and 8 of Embodiments 1 and 2.

Figure 14:
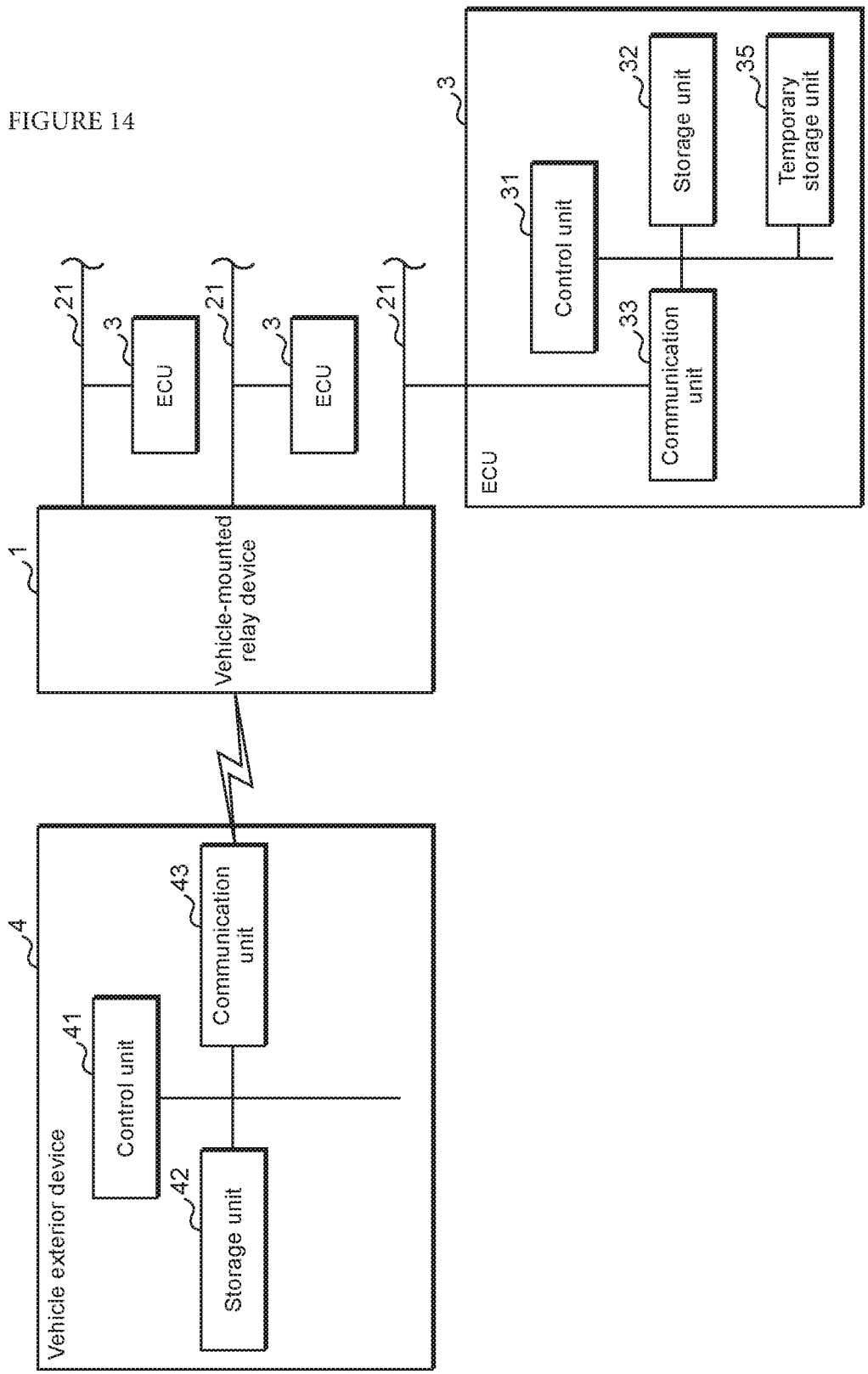
FIG. 14 is a block diagram illustrating configurations of ECUs and the vehicle exterior device that communicate with the vehicle-mounted relay device.

FIG. 14 is a block diagram illustrating configurations of ECUs 3 and a vehicle exterior device 4 that communicate with a vehicle-mounted relay device 1. FIG. 14 corresponds to FIG. 3 of Embodiment 1.

The vehicle-mounted relay device 1 and a communication system 2 of the present embodiment have substantially the same configurations as the vehicle-mounted relay device 1 and the communication system 2 of Embodiments 1 and 2. Hereinafter, differences from Embodiments 1 and 2 will be described, and the same reference numerals are given to the structures that correspond to those of Embodiments 1 and 2, and their description is omitted.

Each ECU 3 is provided with an accumulation unit 36. Note that the ECU 3 may also be provided with the saving unit 34 and the temporary storage unit 35 of Embodiments 1 and 2.

Accumulated data is accumulated in the accumulation unit 36. "Accumulated data" refers to data obtained by compressing failure information, control history information of the vehicle-mounted device, and the like. After use of the vehicle 5 is started, the control unit 31 generates data to be accumulated at a predetermined timing, and writes the generated data to be accumulated into the accumulation unit 36.

For example, the control unit 31 gives an operation instruction to the vehicle-mounted device that is to be controlled, and also obtain a detection result of detection performed by a not-shown sensor that detects the operation state of the vehicle-mounted device. If the content of the operation instruction given to the vehicle-mounted device differs from the operation state of the vehicle-mounted device that is indicated by the detection result of the detection by the sensor, the control unit 31 generates data to be accumulated that includes failure information.

Information that indicates the point in time when accumulated data was generated is associated with the accumulated data, and if the free space of the accumulation unit 36 is insufficient when new accumulated data is written, the oldest accumulated data is successively deleted.

Accumulated data of the ECUs 3 is collected by the vehicle exterior device 4 at an appropriate timing (for example, when an automobile safety inspection is performed).

The storage unit 12 of the vehicle-mounted relay device 1 has stored programs that are to be followed by the control unit 11, a data amount table 161, a read table 162, a reading target table 163, and a reading time table 164 are stored. Note that it is also possible that the storage unit 12 has stored the data amount table 121, the save table 122, the update table 123, the reading/writing speed table 124, and the write-back table 125 of Embodiments 1 and 2.

In the data amount table 161, identification information of the ECUs 3, and the data amounts of accumulated data that are stored in the accumulation units 36 of the respective ECUs 3 are stored in association with each other. The data amounts indicate the upper limit for the storage capacity of the accumulation unit 36, and are stored in the data amount table 161 at the time of factory shipment. This is because, after an appropriate time has elapsed from when the vehicle 5 is started to be used, the data amount of accumulated data stored in the accumulation unit 36 can be regarded as having the same level as the upper limit for the storage capacity of the accumulation unit 36. Accordingly, the storage unit 12 that includes the data amount table 161 functions as a "maximum storage unit" in the embodiments of the present invention.

Note that, by inquiring of each ECU 3 about the data amount of accumulated data at an appropriate timing, the control unit 11 may store the data amount into the data amount table 161.

In the read table 162, a plurality of data amounts, the required amounts of stored power in the electric power storage device 51 that are respectively needed to read the data amounts of accumulated data from the accumulation unit 36, and transmit the read data amounts to the vehicle exterior device 4 (hereinafter, referred to as "amounts of stored power for read") are stored in association with each other.

By referencing the data amount table 161 based on the identification information of the ECU 3 whose accumulated data is to be collected, the data amount of accumulated data can be obtained, and thus it is possible to estimate, by referencing the read table 162 based thereon, the amount of stored power that is needed to collect the accumulated data (amount of stored power for read).

In the reading target table 163, identification information of the accumulated data to be collected by the vehicle exterior device 4, and identification information of the ECUs 3 that include the accumulated data are stored in association with each other. In the present embodiment, an example in which one ECU 3 includes the accumulated data to be collected by the vehicle exterior device 4 is described, but it is also possible that a plurality of ECUs 3 may include the accumulated data to be collected by the vehicle exterior device 4.

By referencing the reading target table 163 based on the identification information of the accumulated data, the identification information of the ECU 3 whose accumulated data is to be collected is known.

In the reading time table 164, identification information of the ECUs 3, and read time periods that are respectively needed to read the accumulated data of the ECUs 3 from the accumulation units 36 and transmit the read accumulated data to the vehicle-mounted relay device 1 are stored in association with each other.

By referencing the reading time table 164 based on the identification information of the ECU 3 whose accumulated data is to be collected, it is possible to estimate a time period (read time period) that is needed to collect the accumulated data.

The tables from the data amount tables 161 to the reading time table 164 have stored various types of information at the time of factory shipment.

Figure 15:
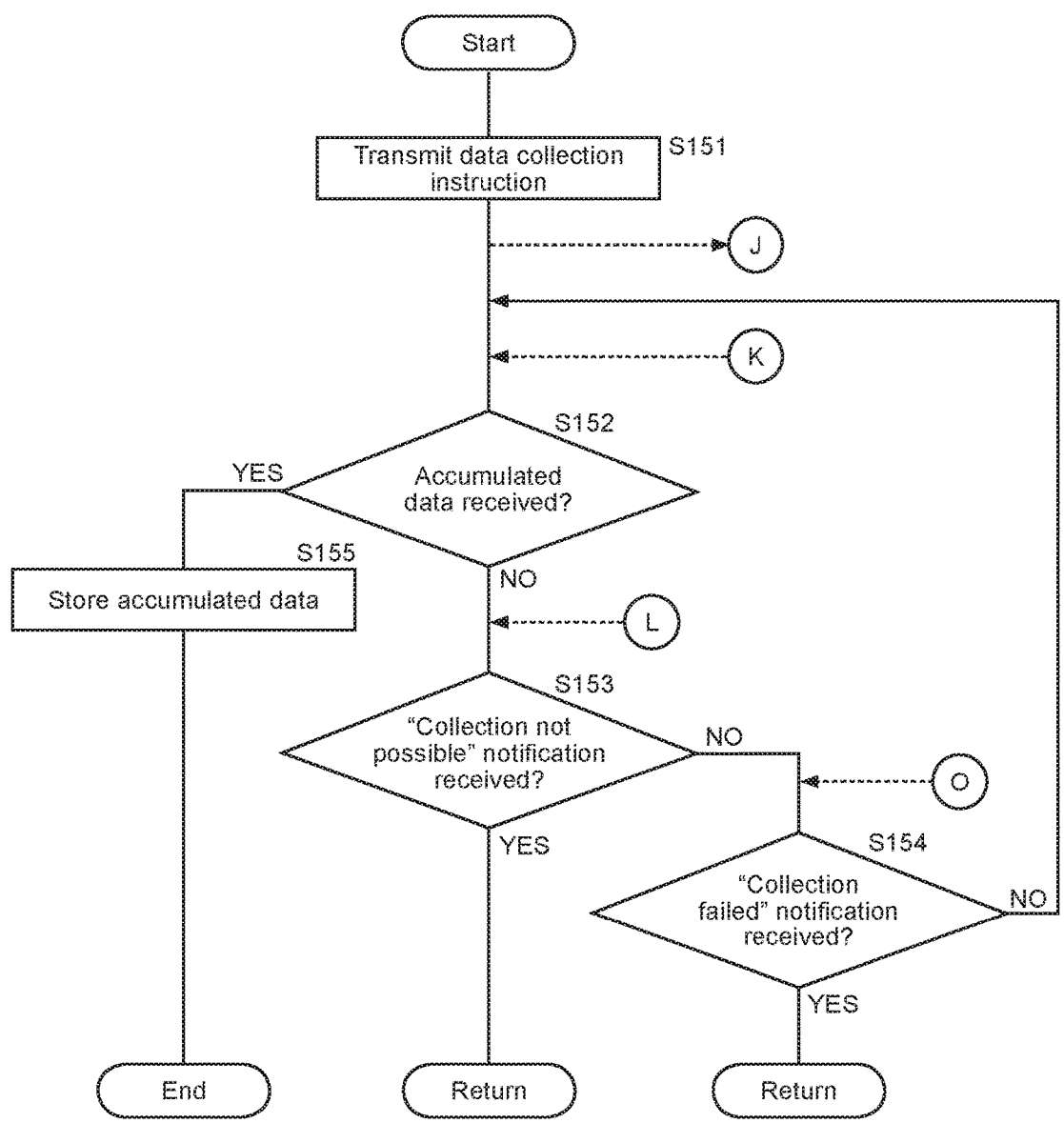
FIG. 15 is a flowchart of a procedure of data collection processing that is executed in the vehicle exterior device.

FIG. 15 is a flowchart of a procedure of data collection processing that is executed in the vehicle exterior device 4.

The control unit 41 transmits a data collection instruction to collect accumulated data to the vehicle-mounted relay device 1 (step S151). The data collection instruction includes identification information of accumulated data to be collected.

Then, the control unit 41 determines whether or not accumulated data has been received (step S152), and if it has not yet been received (No in step S152), the control unit 41 determines whether or not a "collection not possible" notification showing that collection of accumulated data is not possible has been received (step S153).

If no "collection not possible" notification has been received (No in step S153), the control unit 41 determines whether or not a "collection failed" notification showing that collection of accumulated data was unsuccessful has been received (step S154). If no "collection failed" notification has been received (No in step S154), the control unit 41 returns the procedure to step S152.

If a "collection not possible" notification has been received (Yes in step S153), or if a "collection failed" notification has been received (Yes in step S154), the control unit 41 waits for, for example, a predetermined waiting time, and then executes the processing in step S151 again.

If accumulated data has been received (Yes in step S152), the control unit 41 writes the received accumulated data into the storage unit 42 (step S155), and the data collection processing ends.

The data collection instruction functions as a "data read instruction" in the embodiments of the present invention.

Figure 16:
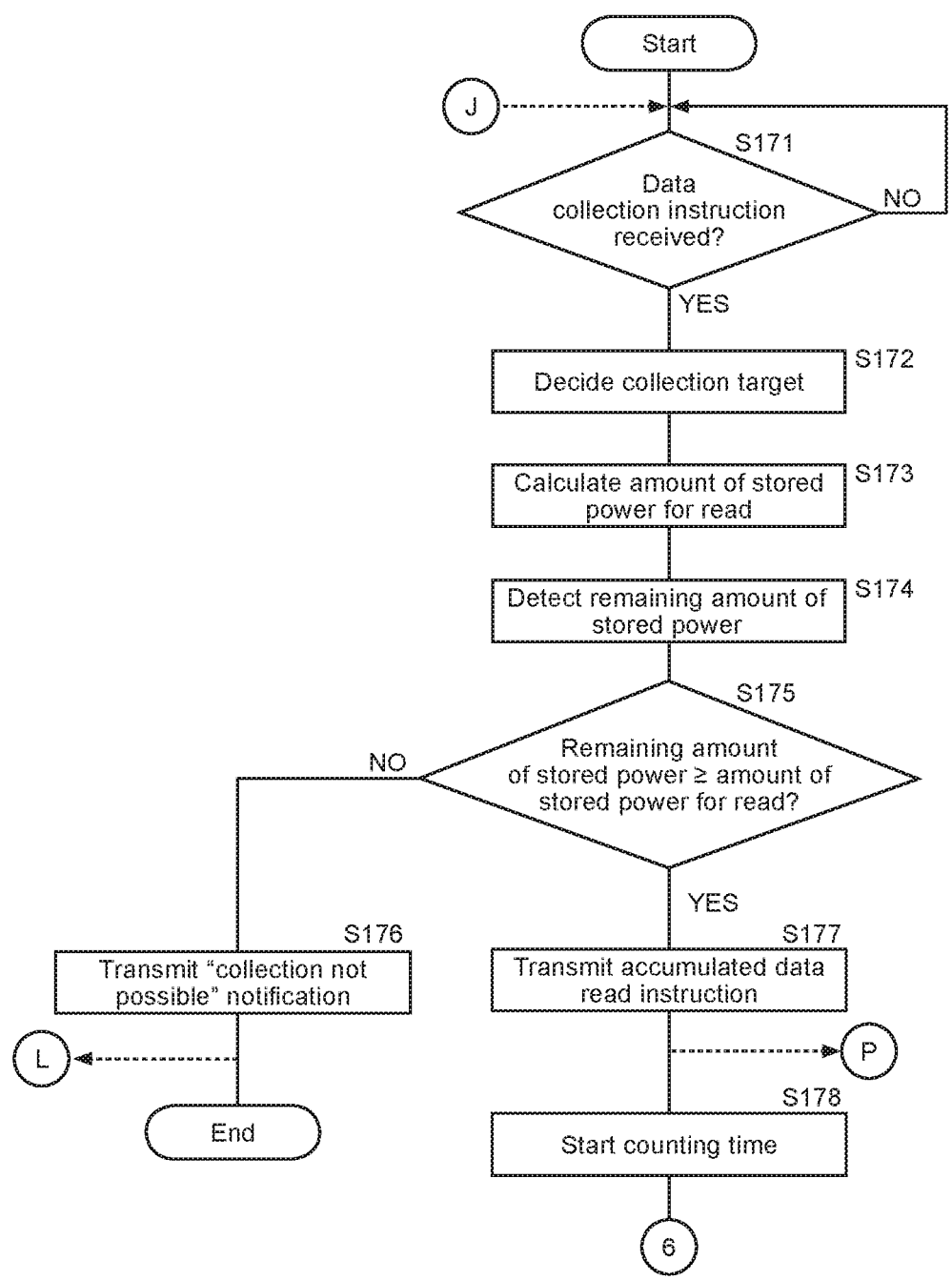
FIG. 16 is a flowchart of a procedure of data relay processing that is executed in the vehicle-mounted relay device.
Figure 17:
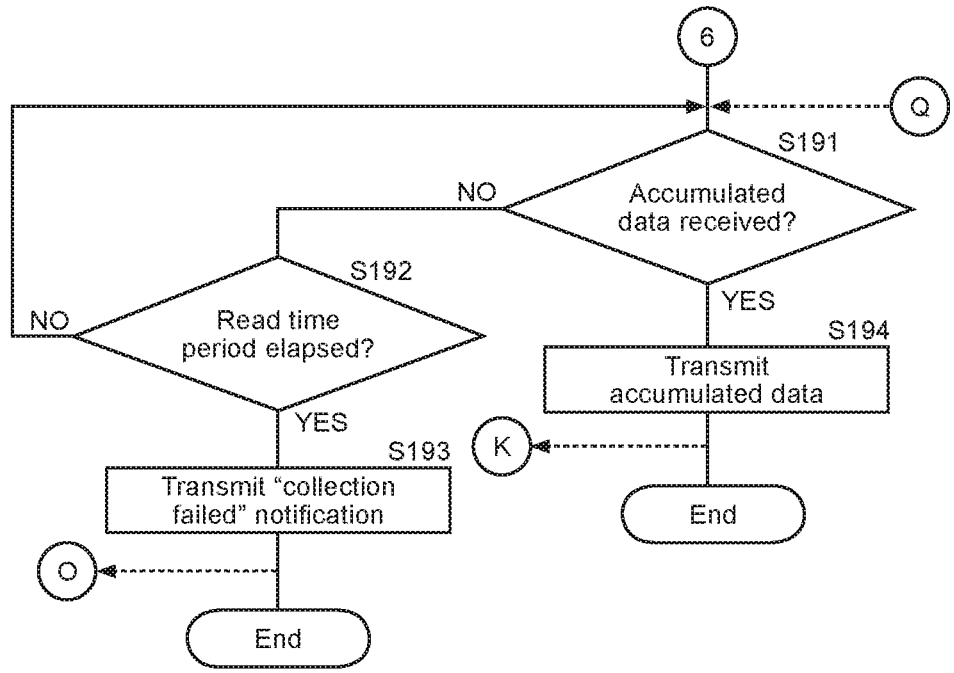
FIG. 17 is a flowchart of the procedure of the data relay processing that is executed in the vehicle-mounted relay device.

FIGS. 16 and 17 are flowcharts of a procedure of data relay processing that is executed in the vehicle-mounted relay device 1.

As shown in FIG. 16, the control unit 11 determines whether or not a data collection instruction has been received via the vehicle-exterior communication unit 14 (step S171), and if it has not yet been received (No in step S171), the control unit 11 executes the processing in step S171 again.

If a data collection instruction has been received (Yes in step S171), the control unit 11 references the reading target table 163 based on the identification information of the accumulated data that is included in the received data collection instruction, and decides the ECU 3 whose accumulated data is to be collected (hereinafter, referred to as "collection target ECU 3") (step S172). The collection target ECU 3 functions as a "reading target" in the embodiments of the present invention, and the control unit 11 that executes the processing in step S172 functions as a "reading deciding means" in the embodiments of the present invention.

Then, the control unit 11 references the data amount table 161 and the read table 162 based on the identification information of the collection target EUC 3, and calculates the amount of stored power for read (step S173). Note that, if there are a plurality of collection target EUCs 3, it is sufficient for the control unit 11 to obtain, in the processing in step S173, the sum of the amounts of stored power for read of the respective EUCs 3.

The amount of stored power for read that was calculated in step S173 refers to the required amount of stored power in the electric power storage device 51 that is needed to collect accumulated data. The control unit 11 that executes the processing in step S173 functions as a "reading calculation means" in the embodiments of the present invention.

Furthermore, the control unit 11 detects the remaining amount of stored power in the electric power storage device 51 by performing processing similar to that in step S36 shown in FIG. 5 of Embodiment 1 (step S174). The control unit 11 that executes the processing of step S174 functions as a "remaining amount detection means" in the embodiments of the present invention.

Then, the control unit 11 determines whether or not the remaining amount of stored power detected in step S174 is equal to or greater than the amount of stored power for read calculated in step S173 (step S175). The control unit 11 that executes the processing in step S175 functions as a "reading determination means" in the embodiments of the present invention.

If "remaining amount of stored power < amount of stored power for read" is met (No in step S175), then collection of the accumulated data is not possible. Therefore, the control unit 11 transmits the "collection not possible" notification to the vehicle exterior device 4 via the vehicle-exterior communication unit 14 (step S176), and the data relay processing ends.

If "remaining amount of stored power ≥ amount of stored power for read" is met (Yes in step S175), then collection of the accumulated data is possible. Therefore, the control unit 11 transmits an accumulated data read instruction to read the accumulated data to the collection target ECU 3 decided in step S172 via the in-vehicle communication unit 13 (step S177). The control unit 11 that executes the processing in step S177 functions as a "reading starting means" in the embodiments of the present invention.

Furthermore, the control unit 11 starts counting the elapsed time from a point in time when the transmission of the accumulated data read instruction is complete (step S178).

Then, as shown in FIG. 17, the control unit 11 determines whether or not reception of the accumulated data via the in-vehicle communication unit 13 is complete (step S191), if it is not complete (No in step S191), the control unit 11 determines whether or not the read time period that is stored in the reading time table 164 in association with the identification information of the collection target ECU 3 decided in step S172 has elapsed (that is, the elapsed time from when the counting of time has started in step S178 exceeds the read time period) (step S192). If the read time period has not yet elapsed (No in step S192), the control unit 11 returns the procedure to step S191.

If the read time period has elapsed (Yes in step S192), the control unit 11 transmits the "collection failed" notification to the vehicle exterior device 4 via the vehicle-exterior communication unit 14 (step S193), ends the data relay processing and.

If the reception of the accumulated data is complete (Yes in step S191), the control unit 11 transmits the accumulated data to the vehicle exterior device 4 via the vehicle-exterior communication unit 14 (step S194), and the data relay processing ends.

In the present embodiment, an example was given in which the accumulated data is transmitted from the vehicle-mounted relay device 1 to the vehicle exterior device 4, but the present invention is not limited to this. For example, it is conceivable that the vehicle-mounted relay device 1 is provided with an accumulation storage unit (not shown) that serves as an external storage unit of the vehicle exterior device 4. In this case, the control unit 11 writes, in step S194, the accumulated data received from the collection target ECU 3 into the accumulation storage unit, and transmits a "reading successful" notification showing that the accumulated data was successfully read to the vehicle exterior device 4, before the data relay processing ends. The control unit 41 of the vehicle exterior device 4 that has received the "reading successful" notification accesses the accumulation storage unit to read the accumulated data. With the configuration as described above, no electric power of the electric power storage device 51 needs to be consumed for communication of accumulated data between the vehicle-mounted relay device 1 and the vehicle exterior device 4.

Figure 18:
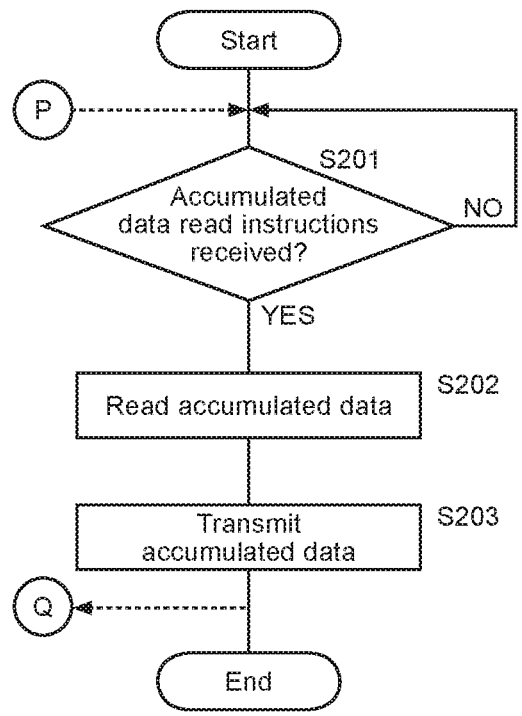
FIG. 18 is a flowchart of a procedure of data reading processing that is executed in an ECU.

FIG. 18 is a flowchart of a procedure of data reading processing that is executed in the ECU 3.

The control unit 31 determines whether or not an accumulated data read instruction has been received (step S201), and if it has not yet been received (No in step S201), the control unit 31 executes gain the processing in step S201.

If an accumulated data read instruction has been received (Yes in step S201), the control unit 31 read the accumulated data from the accumulation unit 36 (step S202), and transmits the read accumulated data to the vehicle-mounted relay device 1 (step S203), and the data reading processing ends.

In the communication system 2 that includes the vehicle-mounted relay device 1 as described above, collection of accumulated data does not start if the remaining amount of stored power in the electric power storage device 51 is insufficient. Accordingly, it is possible to suppress failures in reading accumulated data from the accumulation unit 36 of an ECU 3 due to electric power shortage.

Embodiment 4

Figure 19:
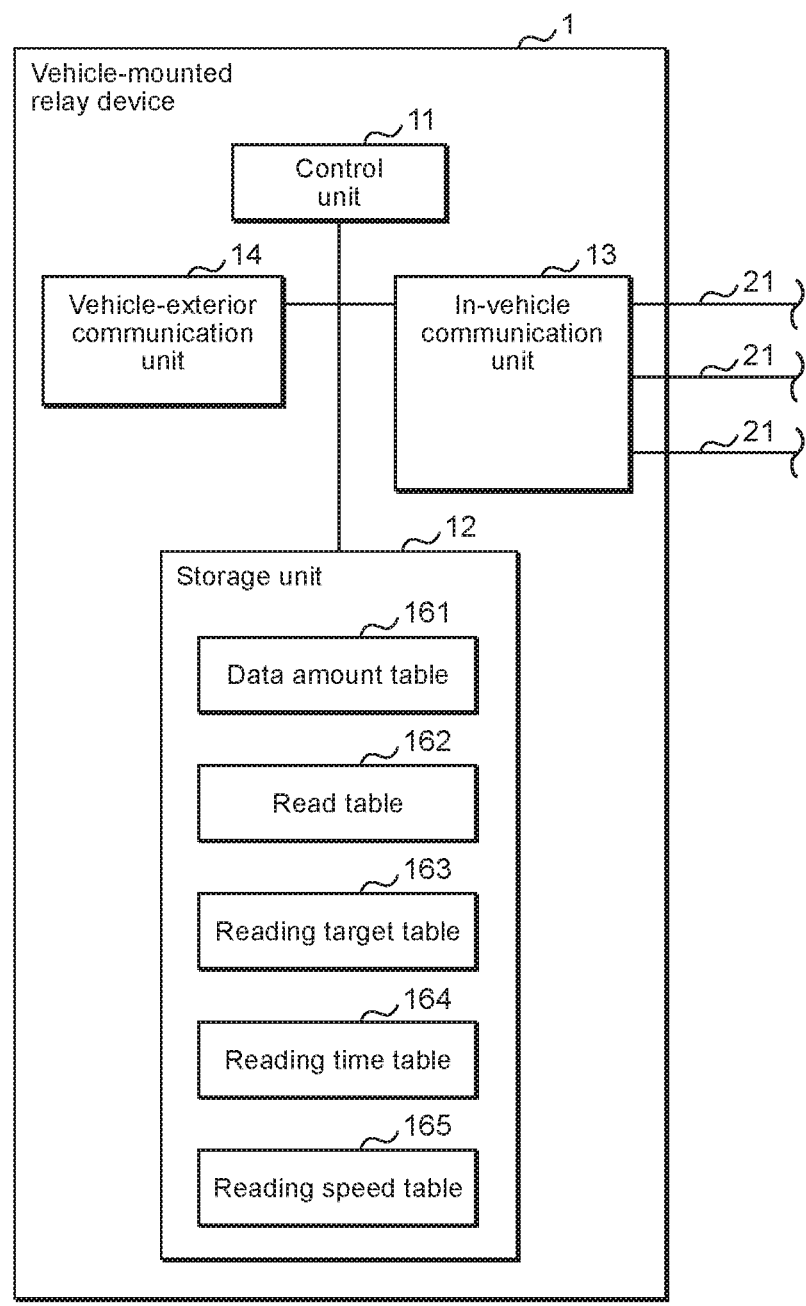
FIG. 19 is a block diagram illustrating a configuration of a vehicle-mounted relay device according to Embodiment 4 of the present invention.

FIG. 19 is a block diagram illustrating a configuration of a vehicle-mounted relay device according to Embodiment 4 of the present invention. FIG. 19 corresponds to FIG. 13 of Embodiment 3.

A vehicle-mounted relay device 1 and a communication system 2 of the present embodiment have substantially the same configurations as the vehicle-mounted relay device 1 and the communication system 2 of Embodiment 1. Hereinafter, differences from Embodiment 1 will be described, and the same reference numerals are given to the structures that correspond to those of Embodiment 1, and their description is omitted.

A reading speed table 165 is further stored in the storage unit 12 of the vehicle-mounted relay device 1.

In the reading speed table 165, identification information of the ECUs 3, and reading speeds of the respective ECUs 3 are stored in association with each other. The reading speed table 165 has stored various information at the time of factory shipment. "Reading speed" refers to the data amount of accumulated data that can be read from the accumulation unit 36 by the control unit 31 per unit time.

By referencing the reading speed table 165 based on the identification information of an ECU 3 whose accumulated data is to be collected, it is possible to obtain the reading speed of the ECU 3 whose accumulated data is to be collected. Based on the obtained reading speed, and the elapsed time from a point in time when transmission of an accumulated data read instruction is complete, it is possible to estimate the data amount of accumulated data that has already been read from the accumulation unit 36.

If the data amount of accumulated data that is to be read from the accumulation unit 36, and the data amount of accumulated data that has already been read from the accumulation unit 36 are known, the remaining data amount of accumulated data can be estimated.

The remaining data amount of accumulated data refers to, of accumulated data to be read from the accumulation unit 36, the amount of data that has not yet been read from the accumulation unit 36. The remaining data amount of accumulated data can be obtained by subtracting the data amount of accumulated data that has already been read from the accumulation unit 36 from the data amount of accumulated data to be read from the accumulation unit 36 (total amount of accumulated data).

Note that the configuration of the vehicle-mounted relay device 1 is not limited to one where the data amount of accumulated data that has already been read from the accumulation unit 36 is obtained by referencing the reading speed table 165. If reading of accumulated data of an ECU 3 and receiving the accumulated data in the vehicle-mounted relay device 1 are performed in parallel, the vehicle-mounted relay device 1 may be configured to obtain the data amount of accumulated data that has already been read from the accumulation unit 36 by detecting the received data amount of accumulated data.

Figure 20:
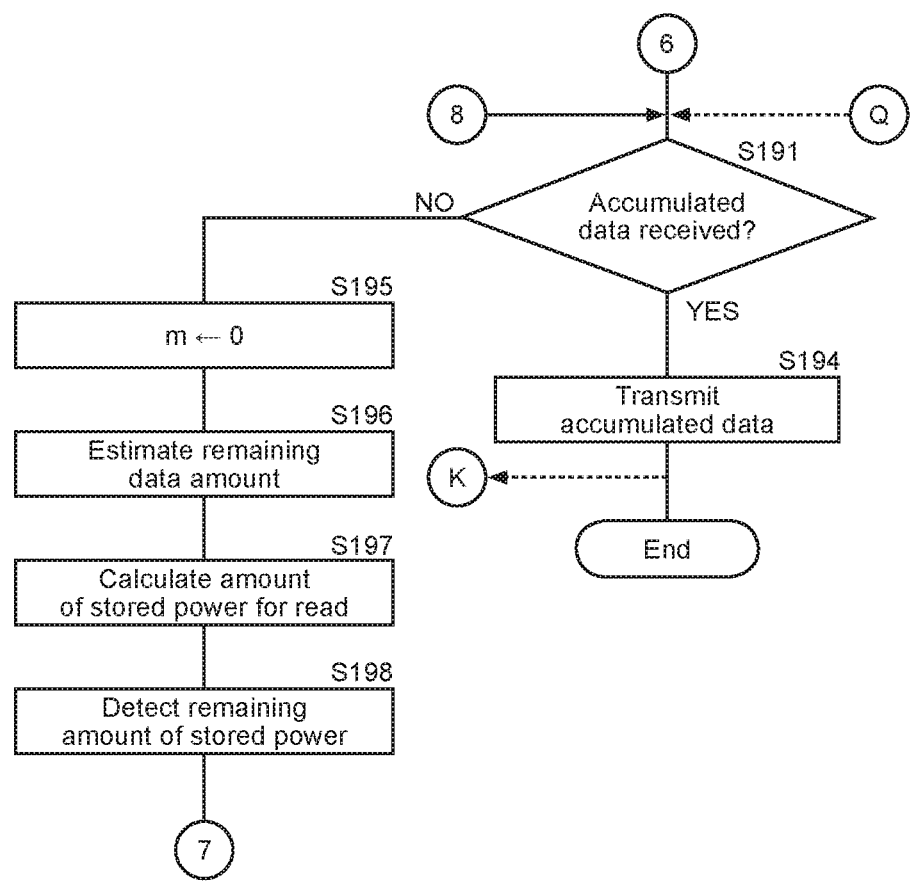
FIG. 20 is a flowchart of a procedure of data relay processing that is executed in the vehicle-mounted relay device.
Figure 21:
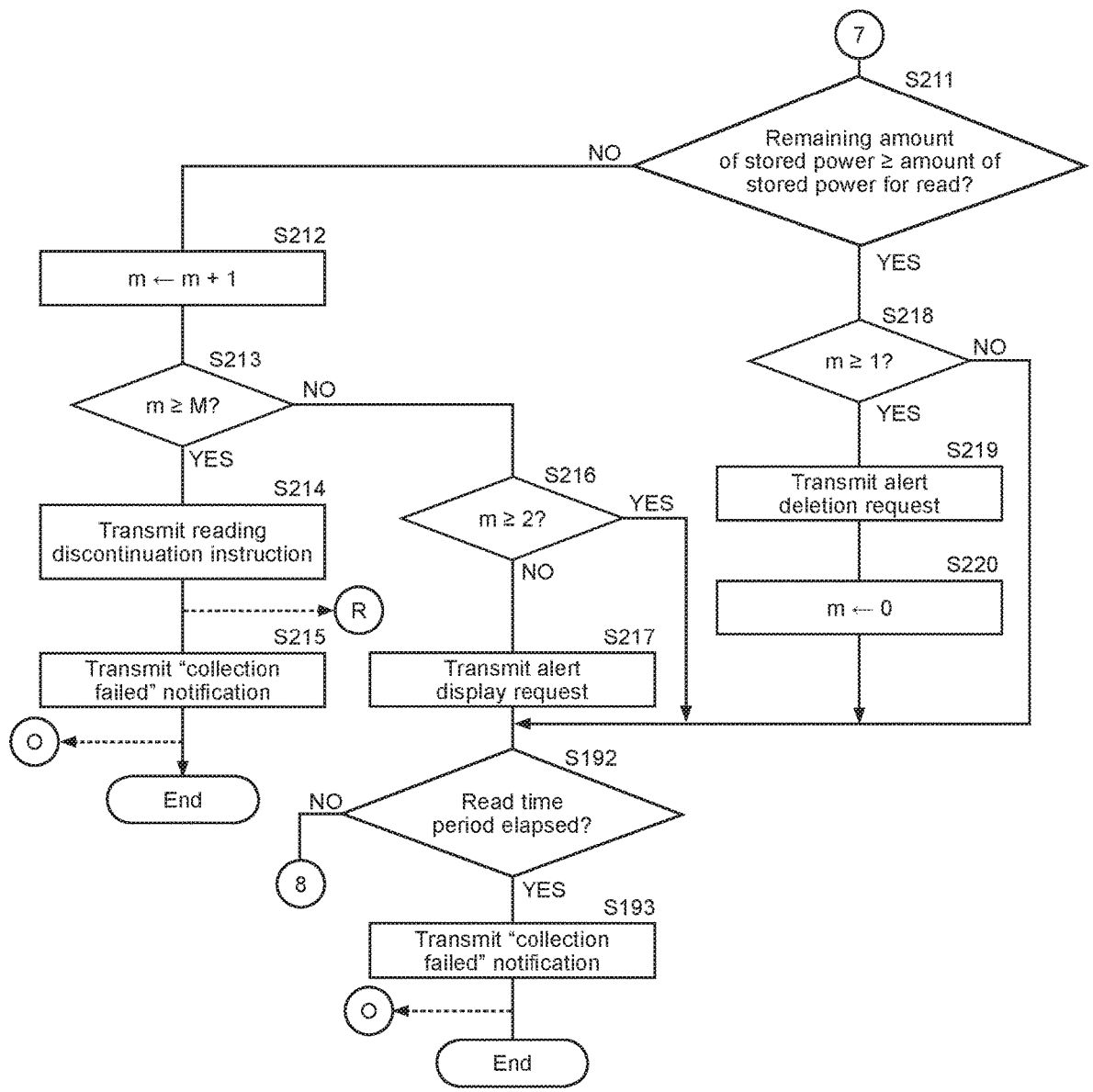
FIG. 21 is a flowchart of the procedure of the data relay processing that is executed in the vehicle-mounted relay device.

FIGS. 20 and 21 are flowcharts of a procedure of data relay processing that is executed in the vehicle-mounted relay device 1.

The data relay processing includes the same processing as in steps S171 to S178 shown in FIG. 16 of Embodiment 3.

The processes of steps S191 to S194 shown in FIGS. 20 and 21 are identical with steps S191 to S194 shown in FIG. 17 of Embodiment 3. Note that, if the determination in step S191 shows "No", the control unit 11 executes processing in step S195 that will be described as follows.

As show in FIG. 20, the control unit 11 resets a variable m to "0" (step S195).

After the processing in step S195 ends, the control unit 11 references the reading speed table 165 based on the identification information of a collection target EUC 3, and estimates the remaining data amount of accumulated data, based on the elapsed time from the start of the counting of time in step S178 and the data amount of accumulated data (step S196).

After the processing in step S196 ends, the control unit 11 references the read table 162 based on the remaining data amount of accumulated data that was estimated in step S196, and calculates the amount of stored power for read (step S197). The control unit 11 that executes step S197 functions as a "reading recalculation means" in the embodiments of the present invention.

Furthermore, the control unit 11 detects the remaining amount of stored power in the electric power storage device 51 by performing processing similar to that in step S36 shown in FIG. 5 of Embodiment 1 (step S198). The control unit 11 that executes the processing in step S198 functions as the "redetecting means" in the embodiments of the present invention.

Then, as shown in FIG. 21, the control unit 11 determines whether or not the remaining amount of stored power detected in step S198 is equal to or greater than the amount of stored power for read calculated in step S197 (step S211).

If "remaining amount of stored power < amount of stored power for read" is met (No in step S211), then there is a likelihood that collection of the accumulated data cannot be continued. However, for example, there is also a likelihood that, in addition to the collection target ECU 3, a light source device, an air-conditioning device, or the like operates for example, and a significant change in voltage of the electric power storage device 51 due to the operation of such a device may lead a wrong determination that the remaining amount of stored power is smaller than the amount of stored power for read.

Accordingly, the control unit 11 increments the variable m by "1" (step S212), and determines whether or not the variable m is equal to or greater than a constant M (step S213). Here, the constant M is an integer that is equal to or greater than 2, and is stored in advance in the storage unit 12. In the present embodiment, M is equal to 3.

If m≥M is met (Yes in step S213), then it has been determined M times in a row that the remaining amount of stored power is smaller than the amount of stored power for read, and thus it is conceivable that the collection of the accumulated data cannot be continued. Accordingly, the control unit 11 transmits a reading discontinuation instruction to discontinue the reading of the accumulated data to the collection target ECU 3 via the in-vehicle communication unit 13 (step S214), and transmits a "collection failed" notification to the vehicle exterior device 4 via the vehicle-exterior communication unit 14 (step S215), and the data relay processing ends.

The control unit 11 that executes the processing in step S211 functions as a "reading continuation determination means" in the embodiments of the present invention. The control unit 11 that executes the processing in step S214 functions as a "reading discontinuation means" in the embodiments of the present invention.

If m<M is met (No in step S213), then it is conceivable that the collection of the accumulated data can be continued. Note however that, since it has been determined once that the remaining amount of stored power is smaller than the amount of stored power for read, it is necessary to alert an operator.

Therefore, the control unit 11 determines whether or not the variable m is equal to or greater than "2" (step S216), and if m≤1 is met (No in step S216), then the control unit 11 communicates with the display ECU 3 via the in-vehicle communication unit 13, and transmits an alert display request to display a predetermined alert message (step S217).

The alert display request that has been transmitted from the collection target EUC 3 is received by the display ECU 3 via the vehicle-mounted relay device 1. The display ECU 3 that has received the alert display request controls the display device 54 to display a predetermined alert message (for example, "collection of accumulated data may be interrupted due to shortage of remaining amount of stored power in the electric power storage device 51"). As a result, the control unit 11 that executes the processing in step S217 functions as the "notification control means" in the embodiments of the present invention.

The operator who has viewed the alert message, for example, turns off the light source device or the air-conditioning device that is operating, so as to suppress unnecessary electric power consumption of the electric power storage device 51.

After the processing in step S217 ends, or if m≥2 is met (Yes in step S216), the control unit 11 shifts the procedure to step S192.

If "remaining amount of stored power ≥ amount of stored power for read" is met (Yes in step S211), then the collection of the accumulated data can be continued.

The control unit 11 determines whether or not the variable m is equal to or greater than "1" (step S218), and if m≥1 is met (Yes in step S218), then the control unit 11 communicates with the display ECU 3 via the in-vehicle communication unit 13, and transmits an alert deletion request to delete the predetermined alert message (step S219).

The display ECU 3 that has received the alert deletion request controls the display device 54 to delete the alert message.

After the processing in step S219 ends, the control unit 11 resets the variable m to "0" (step S220).

After the processing in step S220 ends, of if m=0 is met (No in step S218), then the control unit 11 shifts the procedure to step S192.

Figure 22:
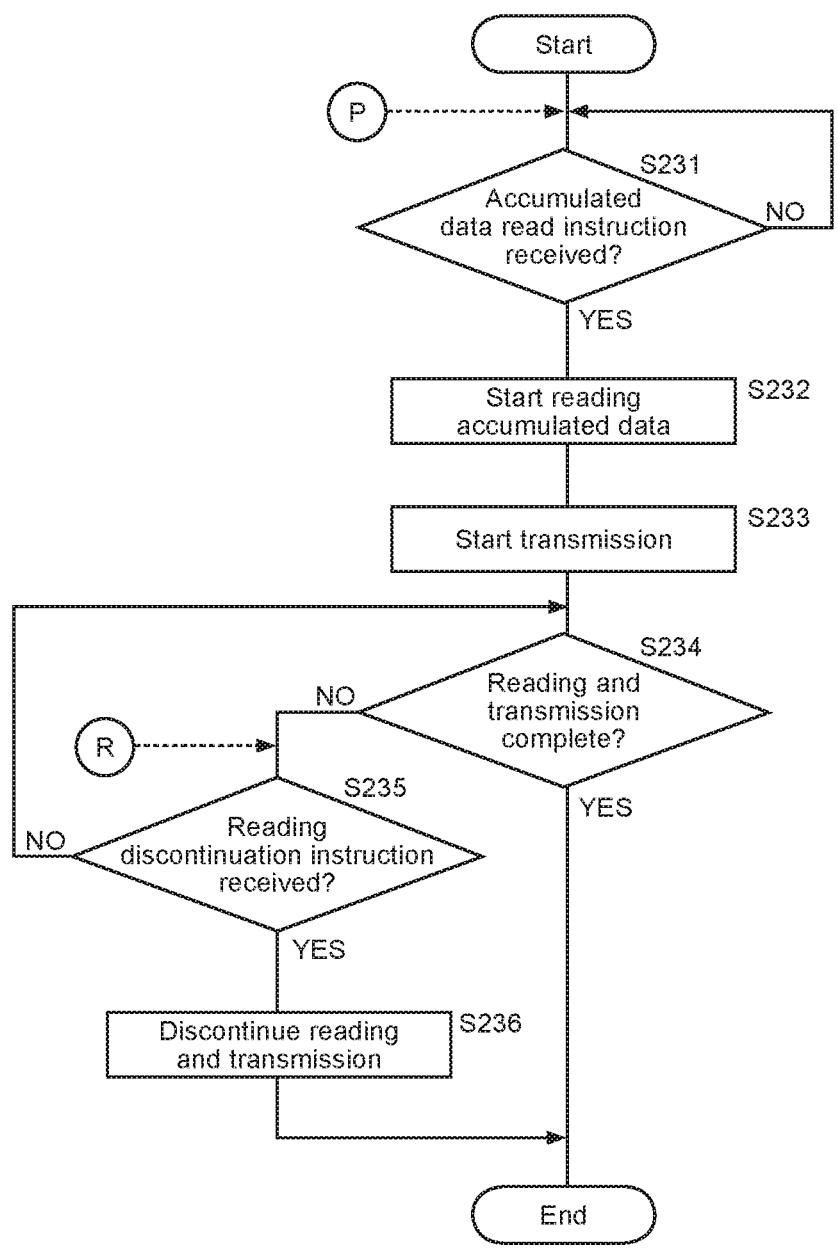
FIG. 22 is a flowchart of a procedure of data reading processing that is executed in an ECU.

FIG. 22 is a flowchart of a procedure of data reading processing that is executed in the ECU 3.

The control unit 31 determines whether or not an accumulated data read instruction has been received (step S231), and if it has not yet been received (No in step S231), the control unit 31 executes again the processing of step S231.

If an accumulated data read instruction has been received (Yes in step S231), the control unit 31 starts reading the accumulated data from the accumulation unit 36 (step S232), and starts transmitting the read accumulated data to the vehicle-mounted relay device 1 (step S233).

The control unit 31 determines whether or not the reading and transmitting of the accumulated data are complete (step S234).

If the reading and transmitting of the accumulated data are not complete (No in step S234), the control unit 31 determines whether or not a reading discontinuation instruction has been received (step S235), and if it has not been received, the control unit 31 returns the procedure to step S234.

If a reading discontinuation instruction has been received (Yes in step S235), the control unit 31 discontinues the reading and transmitting of the accumulated data (step S236), and the data reading processing ends.

If the reading and transmitting of the accumulated data are complete (Yes in step S234), the control unit 31 ends the data reading processing.

The communication system 2 that includes the vehicle-mounted relay device 1 as described above has the same functions and effects as those of Embodiment 3.

Furthermore, in the communication system 2, the remaining amount of stored power in the electric power storage device 51 is monitored continually after the start of a program update. When the remaining amount of stored power in the electric power storage device 51 becomes insufficient, the collection of the accumulated data is discontinued.

Note that if the collection of the accumulated data is discontinued, the vehicle-mounted relay device 1 may also transmit even only the received accumulated data to the vehicle exterior device 4.

The embodiments disclosed herein are exemplary in all respects, and should be construed as being not limitative. The scope of the present invention is intended to include all modifications within the scope and meaning equivalent to the claims rather than the meaning described above.

Furthermore, the vehicle-mounted relay device 1 may include constituent elements that are not disclosed in Embodiments 1 to 4 as long as the present invention is effected.

The structural requirements (technical features) that are disclosed in the embodiments can be combined with each other, and the combinations can establish new technical features.

The invention claimed is:

1. A vehicle-mounted relay device configured to receive, from a vehicle exterior device, a data write instruction to write data, as well as write data to be written, and to relay communication between a plurality of vehicle-mounted control devices that each include a data storage unit in which data is stored, that are supplied with electric power from an electric power storage device, that control operation of a vehicle-mounted device, and that write write data given to them into the data storage unit, the vehicle-mounted relay device comprising:
   writing deciding means for deciding a writing target of a respective one of the plurality of vehicle-mounted control devices that is to write the write data and is included in the plurality of vehicle-mounted control devices, in accordance with the received data write instruction;
writing calculation means for calculating a required amount of power that is needed for writing the write data;
   a storage unit having a data amount table and a save table, the data amount table storing an identification information of each of the plurality of vehicle-mounted control devices and an amount of data for a program relating to the write data and an identification information for each one of the respective plurality of vehicle-mounted control devices, the save table storing the required amounts of stored power needed to read the program, compress the program and write the program, wherein the writing calculation means, processes the amount of data stored in the data amount table and the required amounts of stored power needed to read the program, compress the program and write the program stored in the save table to calculate the required amount of power that is needed for writing the write;
   dividing data mean for dividing the data and transmitting the data sequentially if the data storage unit is smaller than the amount of data of the write data;
   remaining amount detection means for detecting a remaining amount of stored power in the electric power storage device;
   writing determination means, the writing determination means processing the required amount of power that is needed for writing the write data in the respective one of the plurality of vehicle-mounted control devices and the remaining amount of stored power that was detected by the remaining amount detection means to determine if there is a sufficient amount of power to write the write data in the respective one of the plurality of vehicle-mounted control devices; and
   writing starting means for causing the writing target to start writing the write data in the respective one of the plurality of vehicle-mounted control devices if it is determined by the writing determination means that there is sufficient amount of power to write the write data.

2. The vehicle-mounted relay device according to claim 1, further comprising:
   redetecting means for redetecting a remaining amount of stored power in the electric power storage device after the writing starting means has started the writing;
   writing recalculation means for calculating a required amount of stored power in the electric power storage device that is needed for writing the write data, based on a remaining data amount of write data that has not yet been written;
   writing continuation determination means for determining whether or not the data writing can be continued, based on the required amount of stored power that was calculated by the writing recalculation means, and the remaining amount of stored power that was detected by the redetecting means;
   an update table storing a plurality of the amount of data and the required amounts of stored power in the electric power storage device that are respectively needed to read the programs having the amounts of data from a temporary storage unit, expand the read programs, and write the expanded programs into the storage unit are stored in association with each other, and wherein the writing calculation means, processes the amount of data stored in the update table and the amounts of stored power in the electric power storage device and that are respectively needed to read the programs having the amounts of data from the temporary storage unit to determine the amount of power that is needed for writing the write;
   writing discontinuation means for causing the writing target to discontinue the writing of the write data if it is determined by the writing continuation determination means that the data writing cannot be continued.

3. The vehicle-mounted relay device according to claim 2, wherein the vehicle-mounted relay device can control operation of a notification device configured to perform notification of information, and further comprises:
   notification control means for letting, if it is determined by the writing continuation determination means that the data writing cannot be continued, the notification device perform notification of information before the discontinuation of the writing is caused by the writing discontinuation means.

4. The vehicle-mounted relay device according to claim 1, wherein the writing calculation means further calculates the amount of power needed to backup an old program based upon the amount of data of the old program.

* * * * *